US012676872B2

(12) United States Patent　　(10) Patent No.: US 12,676,872 B2
Claireaux　　(45) **Date of Patent: *Jul. 7, 2026**

(54) ANOMALOUS NETWORK BEHAVIOUR IDENTIFICATION

(71) Applicant: BRITISH TELECOMMUNICATIONS PUBLIC LIMITED COMPANY, London (GB)

(72) Inventor: Leah Claireaux, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 133 days.

This patent is subject to a terminal disclaimer.

(21) Appl. No.: 18/261,875

(22) PCT Filed: Dec. 21, 2021

(86) PCT No.: PCT/EP2021/087145
§ 371 (c)(1),
(2) Date: Jul. 18, 2023

(87) PCT Pub. No.: WO2022/156986
PCT Pub. Date: Jul. 28, 2022

(65) Prior Publication Data
US 2024/0089278 A1　　Mar. 14, 2024

(30) Foreign Application Priority Data
Jan. 19, 2021　(GB) ...................................... 2100702

(51) Int. Cl.
　*H04L 29/06*　　(2006.01)
　*H04L 9/40*　　(2022.01)
(52) U.S. Cl.
　CPC ................................ *H04L 63/1425* (2013.01)

(58) Field of Classification Search
CPC ............. H04L 63/1425; H04L 63/1441; H04L 63/1416; H04L 63/1433; G06F 21/55; G06F 21/577
See application file for complete search history.

(56) References Cited

U.S. PATENT DOCUMENTS

| 9,185,095 B1 | 11/2015 | Moritz et al. |
| 9,514,293 B1 | 12/2016 | Moritz et al. |

(Continued)

FOREIGN PATENT DOCUMENTS

| CN | 107633263 A | 1/2018 |
| CN | 109040130 A | 12/2018 |

(Continued)

OTHER PUBLICATIONS

Shi et al., "Multi-layer Graph Neural Network-Based Random Anomalous Behavior Detection," 2021 International Conference on Digital Society and Intelligent Systems (DSInS) Year: 2021 | Conference Paper | Publisher: IEEE.*

(Continued)

*Primary Examiner* — Roderick Tolentino
(74) *Attorney, Agent, or Firm* — EIP US LLP

(57)　　ABSTRACT

A computer implemented method of identifying anomalous behavior of a computer system in a set of intercommunicating computer systems can include monitoring communication between computer systems in the set to generate, for each of a first and second plurality of time periods, with a first and second duration respectively, a first and a second vector representation of each of the computer systems. First vector representations corresponding to different respective ones of the first plurality of time periods are compared to identify behavior of a target computer system at a first temporal resolution. Second vector representations corresponding to different respective ones of the second plurality of time periods are compared to identify behavior of the (Continued)

target computer system at a second temporal resolution. Based on the behavior at one or more of the first and second temporal resolutions, anomalous behavior of the target computer system is identified.

22 Claims, 6 Drawing Sheets

(56) References Cited

U.S. PATENT DOCUMENTS

| | | | |
|---|---|---|---|
| 9,798,876 | B1 | 10/2017 | Parker-Wood et al. |
| 10,523,697 | B2 | 12/2019 | Lee et al. |
| 10,749,883 | B1 | 8/2020 | Martin |
| 10,949,534 | B2 | 3/2021 | Martin et al. |
| 11,108,787 | B1 | 8/2021 | Shen et al. |
| 11,509,671 | B2 | 11/2022 | Servajean et al. |
| 11,552,977 | B2 * | 1/2023 | Gibson ............... H04L 63/1425 |
| 11,632,382 | B2 * | 4/2023 | Almaz ................... H04L 67/535 |
| | | | 709/224 |
| 11,924,048 | B2 | 3/2024 | Servajean et al. |
| 2005/0193281 | A1 | 9/2005 | Ide et al. |
| 2009/0234899 | A1 | 9/2009 | Kramer |
| 2010/0114973 | A1 | 5/2010 | Goyal |
| 2012/0072983 | A1 | 3/2012 | Mccusker et al. |
| 2012/0131674 | A1 | 5/2012 | Wittenschlaeger |
| 2012/0183139 | A1 * | 7/2012 | Matsuo ................. H04L 63/166 |
| | | | 380/255 |
| 2014/0096249 | A1 | 4/2014 | Dupont et al. |
| 2014/0245443 | A1 | 8/2014 | Chakraborty |
| 2014/0279762 | A1 | 9/2014 | Xaypanya et al. |
| 2014/0358671 | A1 * | 12/2014 | Wei .................... G06Q 30/0248 |
| | | | 705/14.45 |
| 2015/0020199 | A1 | 1/2015 | Neil |
| 2015/0269050 | A1 | 9/2015 | Filimonov et al. |
| 2016/0021141 | A1 | 1/2016 | Liu et al. |
| 2016/0205122 | A1 | 7/2016 | Bassett |
| 2016/0359695 | A1 | 12/2016 | Yadav et al. |
| 2017/0126712 | A1 | 5/2017 | Crabtree |
| 2017/0279698 | A1 | 9/2017 | Sartran et al. |
| 2018/0004948 | A1 | 1/2018 | Martin et al. |
| 2018/0103052 | A1 | 4/2018 | Choudhury et al. |
| 2018/0152468 | A1 | 5/2018 | Nor et al. |
| 2018/0219895 | A1 | 8/2018 | Silver et al. |
| 2018/0260562 | A1 | 9/2018 | Chen et al. |
| 2018/0336437 | A1 | 11/2018 | Cheng et al. |
| 2018/0367548 | A1 | 12/2018 | Stokes et al. |
| 2019/0132344 | A1 | 5/2019 | Lem et al. |
| 2019/0173899 | A1 | 6/2019 | Tews |
| 2019/0312734 | A1 | 10/2019 | Wentz et al. |
| 2020/0067969 | A1 | 2/2020 | Abbaszadeh et al. |
| 2020/0082098 | A1 | 3/2020 | Gil et al. |
| 2020/0092316 | A1 | 3/2020 | Tang et al. |
| 2020/0175161 | A1 | 6/2020 | Giaconi |
| 2020/0220892 | A1 | 7/2020 | Gibson |
| 2020/0304523 | A1 | 9/2020 | Yadav et al. |
| 2020/0358804 | A1 | 11/2020 | Crabtree et al. |
| 2021/0004704 | A1 * | 1/2021 | Dang ...................... H04L 67/10 |
| 2021/0099475 | A1 * | 4/2021 | Eshghi ................ G06F 11/3438 |
| 2021/0152581 | A1 * | 5/2021 | Hen ........................ G06F 21/604 |
| 2021/0194903 | A1 * | 6/2021 | Medvedovsky .... H04L 63/1416 |
| 2021/0243210 | A1 * | 8/2021 | Bernardi ............... G06F 21/552 |
| 2022/0201023 | A1 * | 6/2022 | Kels ...................... H04L 61/103 |
| 2024/0089278 | A1 | 3/2024 | Leah |

FOREIGN PATENT DOCUMENTS

| | | |
|---|---|---|
| EP | 3355547 A1 | 8/2018 |
| EP | 3663950 A1 | 6/2020 |
| EP | 3681124 A1 | 7/2020 |
| EP | 3681124 B1 | 1/2022 |
| GB | 2581011 A | 8/2020 |
| WO | 2017019391 A1 | 2/2017 |
| WO | WO-2017087840 A1 | 5/2017 |
| WO | 2017167544 A1 | 10/2017 |
| WO | 2017167545 A1 | 10/2017 |
| WO | 2018224669 A1 | 12/2018 |
| WO | 2018224670 A1 | 12/2018 |
| WO | WO-2020046260 A1 | 3/2020 |
| WO | WO-2020114922 A1 | 6/2020 |

OTHER PUBLICATIONS

Zambon et al., "Graph iForest: Isolation of anomalous and outlier graphs," 2022 International Joint Conference on Neural Networks (IJCNN) Year: 2022 | Conference Paper | Publisher: IEEE.*

Ayoade G., et al., "Evolving Advanced Persistent Threat Detection using Provenance Graph and Metric Learning," IEEE Conference on Communications and Network Security, Jun. 2020, 10 pages.

Combined Search and Examination Report under Sections 17 and 18(3) for Great Britain Application No. 2100702.6, mailed on May 20, 2021, 7 pages.

Eddy S R., "What is a Hidden Markov Model?," Nature Biotechnology, vol. 22 (10), Oct. 2004, pp. 1315-1316.

Grover A., et al., "node2vec: Scalable Feature Learning for Networks," arXiv: 1607.00653v1 [cs.SI], Jul. 3, 2016, 10 pages.

"On Generalizing Neural Node Embedding Methods to Multi-Network Problems", Heimann and Koutra, 2017, 4 pages.

International Search Report and Written Opinion for Application No. PCT/EP2021/087145, mailed on Apr. 22, 2022, 11 pages.

Mikolov T., et al., "Efficient Estimation Of Word Representations In Vector Space," Arxiv, Corr (Computing Research Repository], Sep. 7, 2013, pp. 1-12.

Muromagi A., et al., "Linear Ensembles of Word Embedding Models," Proceedings of the 21st Nordic Conference of Computational Linguistics, Gothenburg, Sweden, May 23-24, 2017, pp. 96-104.

An, et al., "Variational Autoencoder based Anomaly Detection using Reconstruction Probability", SNU Data Mining Center, Feb. 2015 Special Lecture on IE, Dec. 27, 2015, pp. 1-18.

Campello, et al., "Density-Based Clustering Based on Hierarchical Density Estimates", In Prosecution Advances in Knowledge Discovery and Data Mining, Part II, LNAI 7819, 2013, pp. 160-172.

Chandola, et al., "Anomaly Detection for Discrete Sequences: A Survey", IEEE Transactions on Knowledge and Data Engineering, vol. 24, No. 5, May 2012, pp. 823-839.

Ester, et al., "A Density-Based Algorithm for Discovering Clusters in Large Spatial Databases with Noise", Proceedings of Knowledge Discovery and Data Mining, AAAI, 1996, pp. 226-231.

Gartner, et al., "On Graph Kernels: Hardness Results and Efficient Alternatives", COLT/Kernel 2003, Learning Theory and Kernel Machines, Lecture Notes in Computer Science, vol. 2777, 2003, pp. 129-143.

Goyal, et al., "Capturing Edge Attributes via Network Embedding", IEEE Transactions on Computational Social Systems, vol. 5, No. 4, Apr. 2018, 10 pages.

Goyal, et al., "DynGEM: Deep Embedding Method for Dynamic Graphs", University of Southern California, Retrieved from the Internet: https://arxiv.org/pdf/1805.11273.pdf, May 29, 2018, 8 pages.

Izakian, et al., "Anomaly Detection and Characterization in Spatial Time Series Data: A Cluster-Centric Approach", IEEE Transactions on Fuzzy Systems, vol. 22, No. 6, Dec. 2014, pp. 1612-1624.

Izakian, et al., "Clustering Spatiotemporal Data: An Augmented Fuzzy C-Means", IEEE Transactions on Fuzzy Systems, vol. 21, No. 5, Oct. 2013, pp. 855-868.

Kim, et al., "Web Traffic Anomaly Detection using C-LSTM Neural Networks", Expert Systems with Applications, vol. 105, 2018, pp. 66-76.

Li, et al., "Multivariate Time Series Anomaly Detection: A Framework of Hidden Markov Models", Applied Soft Computing, vol. 60, 2017, pp. 229-240.

Niepert, et al., "Learning Convolutional Neural Networks for Graphs", Proceedings of the 33 rd International Conference on Machine Learning, New York, NY, USA, 2016. JMLR: W&CP vol. 48, arXiv: 1605.05273v4 [cs.LG], Jun. 8, 2016, 10 pages.

Page, "The PageRank Citation Ranking: Bringing Order to the Web", Jan. 29, 1998, pp. 1-17.

(56) References Cited

OTHER PUBLICATIONS

Pei, et al., "Advances in Knowledge Discovery and Data Mining, Part II", 17th Pacific-Asia Conference, PAKDD 2013, Gold Coast, Australia, Proceedings, Part I, Apr. 2013, 608 pages.

Radford, et al., "Network Traffic Anomaly Detection Using Recurrent Neural Networks", XP055554771, Retrieved from the Internet, https://arxiv.org/pdf/1803.10769.pdf, Mar. 28, 2018, 7 pages.

Ring, et al., "IP2Vec: Learning Similarities Between IP Addresses", IEEE International Conference on Data Mining Workshops, 2017, pp. 657-666.

Rumelhart, et al., "Learning Internal Representations by Error Propagation", Institute for Cognitive Science Report 8506, Sep. 1985, 49 pages.

Vishwanathan, et al., "Graph Kernels", Journal of Machine Learning Research, vol. 11, 2010, pp. 1201-1242.

Weisstein, Eric W., "Isomorphic Graphs", WolframMathworld, From MathWorld—A Wolfram Web Resource, Available Online at <https://mathworld.wolfram.com/IsomorphicGraphs.html>, Oct. 2018, 2 pages.

Yu, et al., "Learning Deep Network Representations with Adversarially Regularized Autoencoders", Proceedings of the 24th ACM SIGKDD International Conference on Knowledge Discovery & Data Mining, KDD '18, vol. 23, Aug. 19-23, 2018, pp. 2663-2671.

Zhang, et al., "Robust Network Traffic Classification", IEEE/ACM Transactions on Networking, vol. 23, No. 4, Aug. 2015, pp. 1257-1270.

* cited by examiner

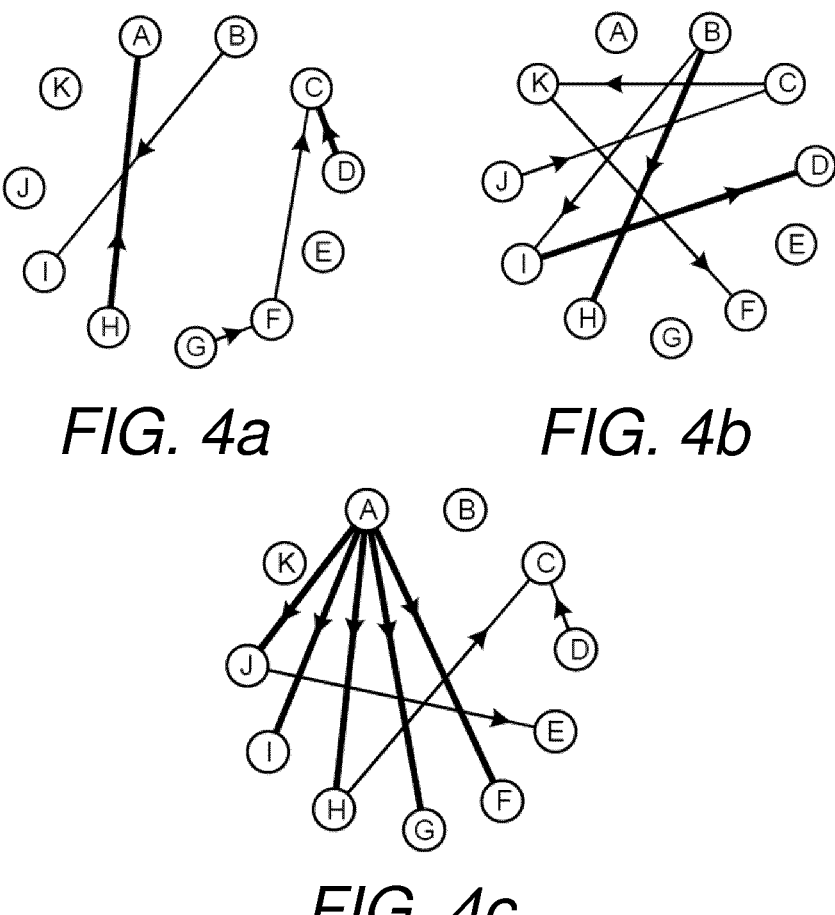
FIG. 4a           FIG. 4b
FIG. 4c
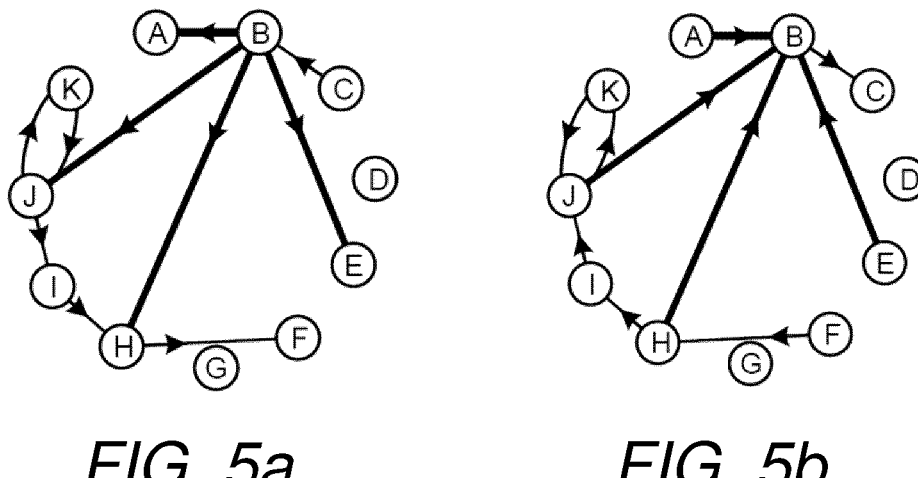
FIG. 5a           FIG. 5b

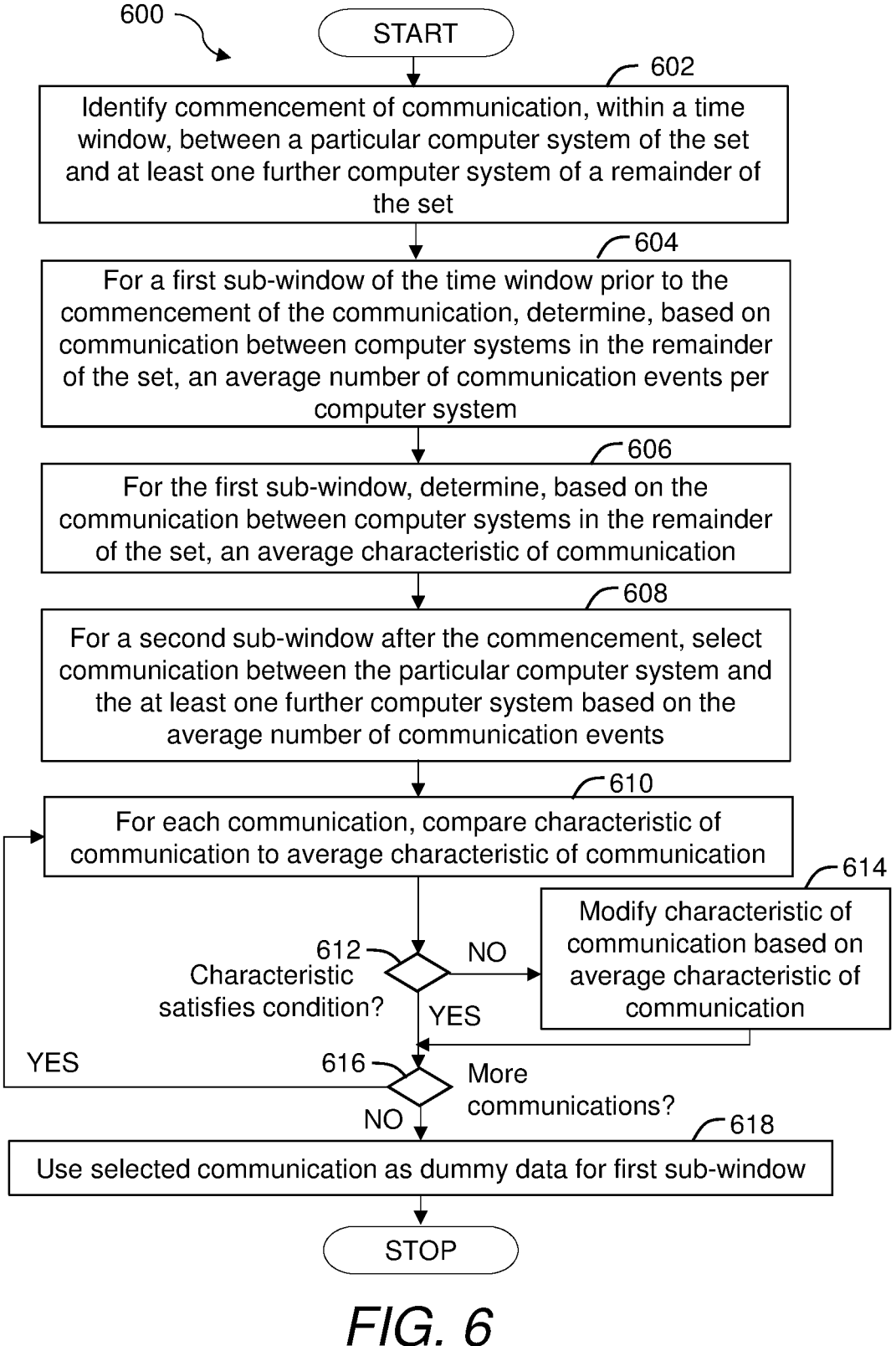

600

START

602

Identify commencement of communication, within a time window, between a particular computer system of the set and at least one further computer system of a remainder of the set

604

For a first sub-window of the time window prior to the commencement of the communication, determine, based on communication between computer systems in the remainder of the set, an average number of communication events per computer system

606

For the first sub-window, determine, based on the communication between computer systems in the remainder of the set, an average characteristic of communication

608

For a second sub-window after the commencement, select communication between the particular computer system and the at least one further computer system based on the average number of communication events

610

For each communication, compare characteristic of communication to average characteristic of communication

614

Modify characteristic of communication based on average characteristic of communication 612
Characteristic satisfies condition?

NO

YES

YES

616

More communications?

NO

618

Use selected communication as dummy data for first sub-window

STOP

START

702

Receive, via a GUI, a selection of a behaviour condition to be satisfied

704

Identify a display set of computer systems that satisfy the behaviour condition

706

Display, via the GUI, a representation of communication between pairs of computer systems in display set

STOP

ANOMALOUS NETWORK BEHAVIOUR IDENTIFICATION

PRIORITY CLAIM

The present application is a National Phase entry of PCT Application No. PCT/EP2021/087145, filed Dec. 21, 2021, which claims priority from GB Patent Application No. 2100702.6, filed Jan. 19, 2021, each of which is hereby fully incorporated herein by reference.

TECHNICAL FIELD

The present disclosure relates to the identification of anomalous behavior of a computer system.

BACKGROUND

Network connected computer systems, whether physical and/or virtual computer systems connected via one or more physical and/or virtual network communication mechanisms, can be susceptible to malicious attack. For example, one or more computer systems can become infected with malicious software such as botnet agents or the like, and such infected systems can instigate malicious communication with other systems such as communications intended to propagate such infections and/or communications intended to affect the operation of target computer systems (e.g. denial of service attacks, hijacking or the like).

It is a longstanding desire to detect such malicious communication occurring in a network of computer systems in order that mitigation measures can be implemented.

SUMMARY

According to a first aspect of the present disclosure, there is provided a computer implemented method of identifying anomalous behavior of a computer system in a set of intercommunicating computer systems, each computer system in the set being uniquely identifiable, the method comprising: monitoring communication between computer systems in the set for a first plurality of time periods to generate, for each of the first plurality of time periods, a first vector representation of each of the computer systems; monitoring communication between computer systems in the set for a second plurality of time periods to generate, for each of the second plurality of time periods, a second vector representation of each of the computer systems, wherein a first duration of each of the first plurality of time periods is different from a second duration of each of the second plurality of time periods; comparing first vector representations corresponding to different respective ones of the first plurality of time periods for a target computer system using a vector similarity function to identify behavior of the target computer system at a first temporal resolution corresponding to the first duration; comparing second vector representations corresponding to different respective ones of the second plurality of time periods for the target computer system using the vector similarity function to identify behavior of the target computer system at a second temporal resolution corresponding to the second duration; and based on the behavior of the target computer system at one or more of the first and second temporal resolutions, identifying anomalous behavior of the target computer system.

In some examples, each of the first vector representations is generated based on at least one walk of a first graph representation of communications between the computer systems during a respective one of the first plurality of time periods, in which nodes of the first graph correspond to computer systems in the set and weighted directed edges between nodes of the first graph correspond to a characteristic of communication between pairs of computer systems in the set; and each of the second vector representations is generated based on at least one walk of a second graph representation of communications between the computer systems during a respective one of the second plurality of time periods, in which nodes of the second graph correspond to computer systems in the set and weighted directed edges between nodes of the graph correspond to the characteristic of communication or a further characteristic of communication between pairs of computer systems in the set. In some of these examples, the method comprises normalizing an input characteristic of communication to determine the characteristic of communication for each respective pair of the pairs of computer systems, wherein normalizing the input characteristic of communication comprises normalizing the input characteristic of communication for each respective pair based on: an average of the input characteristic of communication for the pairs of computer systems; and a dispersion of the input characteristic of communication for the pairs of computer systems. In some of these examples, the characteristic of communication is a second normalized characteristic of communication, and normalizing the input characteristic of communication comprises: normalizing the input characteristic of communication for each respective pair based on the average and the dispersion, to obtain a first normalized characteristic; and obtaining the second normalized characteristic based on the first normalized characteristic such that a relationship between the first and second normalized characteristics is expressible as:

$$C_2 = AC_1 + B$$

where $C_1$ is the first normalised characteristic, $C_2$ is the second normalised characteristic, A is a first constant, and B is a second constant. In some of these examples, the characteristic of communication includes one or more of: a flow of network traffic from a source computer system to a destination computer system; and a volume of data communicated from a source computer system to a destination computer system.

In examples, the first duration is shorter than the second duration and at least one of the first plurality of time periods overlaps one of the second plurality of time periods.

In examples, the method comprises: identifying commencement of communication between a particular computer system of the set and at least one further computer system of a remainder of the set within a time window comprising the first plurality of time periods and/or the second plurality of time periods, such that there is a first sub-window of the time window in which the particular computer system is not in communication with the remainder of the set and a second sub-window of the time window, subsequent to the first sub-window, in which the particular computer system is in communication with the at least one further computer system; and generating dummy communication between the particular computer system and at least one computer system of the remainder of the set for the first sub-window, based on communication between computer systems in the remainder of the set within the first sub-window and the communication between the particular computer system and the at least one further computer system within the second sub-window, wherein at least one of the first vector representations and/or at least one of the second vector representations of the particular computer system is based on the dummy communication. In some of these examples, the target computer system is the particular computer system, and comparing the first vector representations for the target computer system comprises comparing: a first one of the first vector representations, corresponding to a first one of the first plurality of time periods within the first sub-window, the first one of the first vector representations based on the dummy communication; and a second one of the first vector representations, corresponding to a second one of the first plurality of time periods within the second sub-window, the second one of the first vector representations based on the communication between the particular computer system and the at least one further computer system within the second sub-window. In some of these examples, the target computer system is the particular computer system, and comparing the second vector representations for the target computer system comprises comparing: a first one of the second vector representations, corresponding to a first one of the second plurality of time periods within the first sub-window, the first one of the second vector representations based on the dummy communication; and a second one of the second vector representations, corresponding to a second one of the second plurality of time periods within the second sub-window, the second one of the second vector representations based on the communication between the particular computer system and the at least one further computer system within the second sub-window. In some of these examples, generating the dummy communication comprises: determining, based on the communication between computer systems in the remainder of the set within the first sub-window, an average characteristic of communication between pairs of computers in the remainder of the set; and selecting, based on the average characteristic of communication, communication between the particular computer system and the at least one further computer system within the second sub-window to use as the dummy communication. In some of these examples, generating the dummy communication further comprises determining, based on the communication between computer systems in the remainder of the set within the first sub-window, an average number of communication events per computer system in the remainder of the set; and selecting the communication comprises selecting, based on the average number and the average characteristic of communication, a predetermined number of communications of the communication between the particular computer system and the at least one further computer system within the second sub-window, as the communication. In some of these examples, selecting the communication comprises: identifying a first subset of communications, of the communication between the particular computer system and the at least one further computer system within the second sub-window, with a respective characteristic of communication that satisfies a condition based on the average characteristic of communication; identifying a second subset of communications, of the communication between the particular computer system and the at least one further computer system within the second sub-window, with a respective characteristic of communication that fail to satisfy the condition based on the average characteristic of communication; modifying the respective characteristic of communication of each of the second subset of communications such that, after modification, the respective characteristic of communication of each of the second subset of communications satisfies the condition based on the average characteristic of communication; and selecting the communication to comprise the first subset of communications and the second subset of communications, after modification.

In some examples, the method comprises: comparing first vector representations corresponding to different respective ones of the first plurality of time periods for each of at least one other computer system of the set, other than the target computer system, using the vector similarity function to identify behavior of each of the at least one other computer system at the first temporal resolution; and comparing second vector representations corresponding to different respective ones of the second plurality of time periods for each of the at least one other computer system using the vector similarity function to identify behavior of each of the at least one other computer system at the second temporal resolution, wherein identifying the anomalous behavior of the target computer system is further based on the behavior of the at least one other computer system at the first and/or second temporal resolutions. In some of these examples, the method comprises: receiving, via a graphical user interface (GUI), a selection of a behavior condition to be satisfied; identifying, based on the behavior of the target computer system and the at least one other computer system at the first and/or second temporal resolutions, a display set of computer systems that satisfy the behavior condition; and displaying, via the GUI, a representation of the communication between pairs of computer systems in the display set. Identifying the display set may comprise identifying the N-most anomalous computer systems of the target computer system and the at least one other computer system at the first and/or second temporal resolutions, based on the behavior of the target computer system and the at least one other computer system at the first and/or second temporal resolutions, where N is an integer. In some of these examples, the behavior condition further indicates a temporal resolution at which anomalous behavior is to be identified, and the identifying the display set comprises identifying the display set based further on the behavior of the target computer system and the at least one other computer system at the first temporal resolution or the second temporal resolution, based on the temporal resolution indicated by the behavior condition. In some of these examples, the method comprises: receiving, via the GUI, an indication of one or more computer systems in the set for which protective measures are to be implemented to protect against malicious communication involving the target computer system; and responsive to receiving the indication, implementing the protective measures for the one or more computer systems in the set. In these examples, the method may further comprise receiving, via the GUI, a further indication of the protective measures that are to be implemented.

In examples, the method comprises, responsive to identifying the anomalous behavior, implementing protective measures for one or more computer systems in the set to protect against malicious communication involving the target computer system.

In examples herein in which protective measures are implemented, the protective measures may include one or more of: preventing network communication to and/or from a particular computer system; performing an antimalware task on one or more of the computer systems; disconnecting one or more of the computer systems; and increasing a level of monitoring of network communication with one or more of the computer systems.

In examples, the method comprises comparing the first vector representations comprises comparing first vector representations corresponding to two different ones of the first plurality of time periods for the target computer system using the vector similarity function, wherein the two different ones of the first plurality of time periods are separated from each other in time by at least one other one of the first plurality of time periods.

In examples, comparing the second vector representations comprises comparing second vector representations corresponding to two different ones of the second plurality of time periods for the target computer system using the vector similarity function, wherein the two different ones of the second plurality of time periods are separated from each other in time by at least one other one of the second plurality of time periods.

According to a second aspect of the present disclosure, there is provided a computer system including a processor and memory storing computer program code for performing the method of any example in accordance with the first aspect of the present disclosure.

According to a third aspect of the present disclosure, there is provided a computer program element comprising computer program code to, when loaded into a computer system and executed thereon, cause the computer to perform the method of any example in accordance with the first aspect of the present disclosure.

BRIEF DESCRIPTION OF THE DRAWINGS

For a better understanding of the present disclosure, reference will now be made by way of example only to the accompany drawings, in which:

FIGS. 4a, 4b and 4c depict graph data structures representing intercommunicating computer systems according to examples.

FIGS. 5a and 5b depict graph data structures representing intercommunicating computer systems according to further examples.

FIG. 6 is a flowchart of a method for generating dummy data for use in identifying anomalous behavior of a computer system in a set of intercommunicating computer systems according to examples.

DETAILED DESCRIPTION

Figures 1, 2:
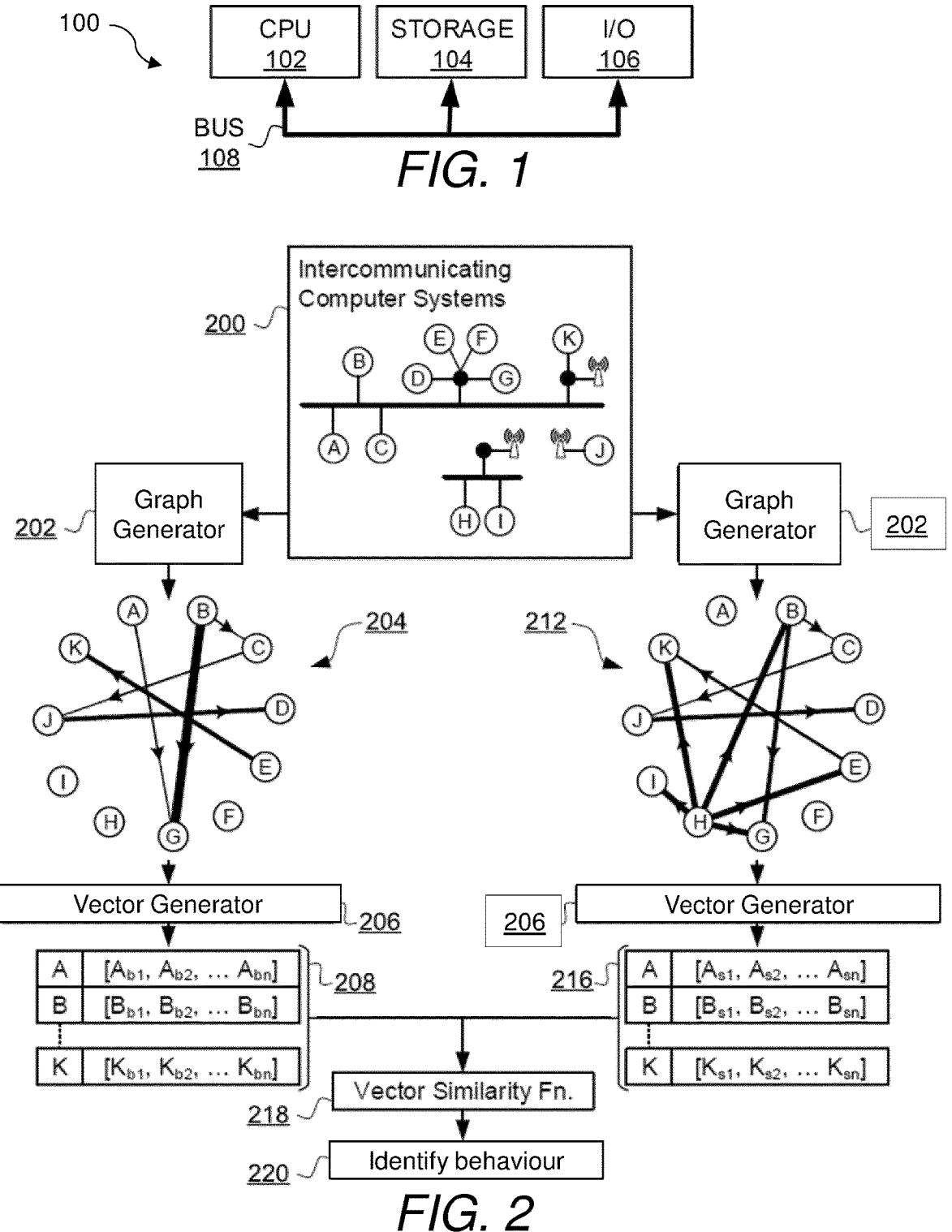
FIG. 1 is a block diagram of a computer system according to examples.
FIG. 2 is a component diagram of an arrangement for identifying anomalous behavior of a computer system in a set of intercommunicating computer systems according to examples.

Physical or virtual computer systems can be physically or virtually connected to other such systems by way of, for example, a physical or virtual communications network. Communication between interconnected computer systems can be monitored to obtain a vector representation of a computer system for a particular time period. In examples herein, a vector representation of a target computer system is compared for time periods of at least two different durations, so as to identify behavior of the target computer system for at least two different temporal resolutions. For example, a comparison of vector representations for different minutes can be performed to identify behavior of the target computer system over the temporal resolution of a minute, and a comparison of vector representations for two different hours can be performed to identify behavior of the target computer system over the temporal resolution of an hour. Anomalous behavior of the target computer system is identified based on the behavior at one or more of the different temporal resolutions. Different attacks may occur over different timescales, so this approach allows various different attacks to be accurately identified.

With this approach, the time periods for which a vector representation is obtained need not be baseline time periods. A baseline time period is for example a time period in which the communicating computer systems are free from malicious intervention, such as when the computer systems are operating in a protected environment. A protected environment is for example a network which is not accessible to, or susceptible to, external communications from untrusted systems, such as a pre-production operation of the communicating computer systems. By identifying baseline behavior of computer systems (i.e. behavior of the computer systems over a baseline time period), an insight into the normal behavior of the computer systems, in the absence of malicious intervention, can be obtained. However, the normal behavior of the computer systems may vary over time, e.g. as new computer systems begin to communicate with other computer systems in the set, or as the behavior of the computer systems changes due to non-malicious influences, such as a change in season or a non-malicious change in user behavior. To compensate for changes in the normal behavior of the computer systems over time, the baseline behavior must generally be recomputed on a regular basis, which can be computationally intensive and time consuming. Furthermore, it can be difficult in practice to obtain a baseline time period in which the computer systems are sufficiently protected from malicious intervention.

By identifying real-time changes in behavior of the computer systems at different temporal resolution, examples herein allow anomalous behavior to be identified without comparing the behavior to baseline behavior. Approaches according to examples herein can hence be applied more efficiently and/or easily to real data than approaches that rely on a comparison to a baseline. For example, if it is determined that a computer system has exhibited a large change in behavior over a relatively long timescale, e.g. as identified at a relatively low temporal resolution, the behavior of the computer system over a shorter timescale, e.g. as identified at a higher temporal resolution, can also be investigated. In this way, a determination can be made as to whether the change was gradual, which may be less suspicious, or whether the change was sudden, which may be more indicative of anomalous activity, without a comparison to baseline behavior.

FIG. 1 is a block diagram of a computer system 100 suitable for the operation of examples herein. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. The storage 104 for example stores computer program code for performing any aspect of the methods described herein. An example of a non-volatile storage device includes a disk or tape storage device. The I/O interface 106 is an interface to devices for the input or output of data, or for both input and output of data. Examples of I/O devices connectable to the I/O interface 106 include a keyboard, a mouse, a display (such as a monitor) and a network connection.

Machine learning is a form of artificial intelligence which allows a machine to learn a model of a process by applying statistical techniques on observed data. This means a machine can predict an outcome when given new, previously unseen data. An example of how machine learning has benefited people is language translation. By having a machine learn several translations from one language to another, the machine can "learn" how words are associated with each other. When a new phrase is entered, the machine can refer to previously seen examples and predict what the translation should be. Machine learning attempts to mimic how humans learn; observe experiences and recall on these when presented something new. Many machine learning techniques have been developed: from utilizing basic mathematical models like linear regression to emulating how a brain works through the use of "neural networks".

One machine learning technique which can be employed in examples herein is known as "word embedding". Word embedding transforms words in a vocabulary into a set of vectors consisting of real numbers. The reason for this process is to allow a machine to represent a meaning of a word in relation to other words. Unlike a human, a machine does not know the meaning of a word but it can work with vector representations of words to represent the meaning of a word. One method of converting words into vectors is known as "Word2Vec" ("Efficient Estimation of Word Representations in Vector Space", Mikolov et al., 2013). Word2Vec is a collection of models for representing words in a corpus of text as a collection of vectors denoting how similar they are to each other depending on sentence context. It involves training a neural network to associate words with each other depending on where they lie within a context. The neural network itself (specifically its weight matrix) is the word embedding and it can be used to predict the context of a given word which appeared in the corpus.

Examples herein identify anomalous behavior of a computer system in a set of intercommunicating computer systems such as physical or virtual computer systems communicating via one or more physical or virtual computer networks in which each computer system is uniquely identifiable (such as by way of an identifier, name, address or other suitable identification). FIG. 2 is a component diagram of an arrangement for identifying anomalous behavior of a computer system in a set 200 of intercommunicating computer systems according to examples. The computer systems of the set 200 are arranged for intercommunication by way of, for example, one or more wired or wireless communications networks. As illustrated in FIG. 2, such networks can be disparate in technology, topology and/or architecture such as a linear, hierarchical, star, wireless, cellular or any other suitable intercommunication means for computer systems. In the example set 200 of computer systems of FIG. 2, eleven computer systems labelled "A" to "K" are depicted, each being communicatively connected to one or more other of the computer systems in the set.

Examples herein are operable to monitor communication between the computer systems in the set 200 for a first plurality of time periods to generate, for each of the first plurality of time periods, a first vector representation of each of the systems. Communication between the computer systems in the set 200 is also monitored for a second plurality of time periods to generate, for each of the second plurality of time periods, a second vector representation of each of the systems. A first duration of each of the first plurality of time periods is different from a second duration of each of the second plurality of time periods. In examples, the first duration of each of the first plurality of time periods is the same as each other, and the second duration of each of the second plurality of time periods is the same as each other (but different from the first duration). For example, each of the first plurality of time periods may be a time period of one minute, and each of the second plurality of time periods may be a time period of one hour (although this is merely a non-limiting example).

In some examples, the first and second vector representations are based on graph representations of the communications between the computer systems. Computer systems can be represented as nodes with communications therebetween represented as edges in a graph representation. Nodes can have associated characteristics corresponding to characteristics of represented computer systems such as unique identifiers, technical, functional or locational characteristics. Edges between nodes can correspond to communications between computer systems corresponding to the nodes such as a volume, frequency, type, speed (e.g. throughput) of data, an effectiveness of communication (e.g. a degree of error in the communication), a level of security of the communication (e.g. presence, absence or a degree of encryption) or other communication characteristics. In this way, edges between nodes of a graph correspond to a characteristic of communication between pairs of computer systems. Notably, such graph representations of communications do not necessarily correspond to the architecture, topology or arrangement of computer networks interconnecting the computer systems. Rather, such graph representations model actual communications between systems in the set 200. Thus, a graph representation of communicating computer systems represents communications over a period of time between computer systems represented in the graph, such as over one of the first plurality of time periods for a first vector representation or over one of the second plurality of time periods for a second vector representation.

In these examples, at least one graph representation is generated for respective one(s) of the first plurality of time periods, and at least one graph representation is generated for respective one(s) the second plurality of time periods. Vector representations of the computer systems, e.g. representative of network communication of the computer systems, are then derived from the generated graph(s). In one example, each of the first vector representations is generated based on a first graph representation of communications between the computer systems during a respective one of the first plurality of time periods. In this example, each of the second vector representations is generated based on a second graph representation of communications between the computer systems during a respective one of the second plurality of time periods. In this case, nodes of the first and second graphs each correspond to respective computer systems in the set. The first vector representations for each of the first plurality of time periods are comparable using a vector similarity function to identify behavior of a target computer system at a first temporal resolution corresponding to the first duration. Similarly, the second vector representations for each of the second plurality of time periods are comparable using the vector similarity function to identify behavior of a target computer system at a second temporal resolution corresponding to the second duration. The second temporal resolution is different from the first temporal resolution as the first duration of each of the first plurality of time periods is different from the second duration of each of the second plurality of time periods. In some cases, the first and second temporal resolutions correspond to first and second timescales over which the behavior of the target computer system is determined. It is to be appreciated that the behavior determined may be a change in behavior (if the behavior of the target computer system has changed), or may indicate that the behavior of the target computer system is unchanged. Based on the behavior of the target computer system over one or more of the first and second temporal resolutions, anomalous behavior of the target computer system can be identified, which may e.g. correspond to changes in behavior over one or both of the temporal resolutions. Identification of an anomaly can trigger the implementation of protective measures for one or more of the computer systems or the entire set 200, for example to protect against malicious communication involving the target computer system.

Protective measures can include, for example, the deployment of firewalls, new security measures, additional authentication or authorization checks, performing an antimalware task on one or more of the computer systems such as execution or updating of antimalware services, preventing network communication to and/or from one or more computer systems or the whole set 200, increasing a level of monitoring of network communication with one or more of the computer systems, tracing or logging, disconnecting one or more of the computer systems and other protective measures as will be apparent to those skilled in the art.

The arrangement of FIG. 2 illustrates the identification of behavior of computer system(s) at a first temporal resolution using graph representations. However, it is to be appreciated that a similar arrangement to that of FIG. 2 may be used to identify behavior of computer system(s) at a second temporal resolution. In the arrangement of FIG. 2, a graph generator 202 as a hardware, software, firmware or combination component, generates a first graph data structure 204 representing communication between computer systems in the set 200 of intercommunicating computer systems for a first one of the first plurality of time periods. Each of at least a subset of the computer systems in the set 200 is provided as a node in the first graph 204 with communications therebetween represented as weighted directed edges in the first graph 204. As depicted in FIG. 2, edges are directed to indicate a net flow of traffic and are weighted (indicated by thickness of an edge) to indicate a volume of data communicated. In this case, the characteristic of communication represented by each edge is the volume of data communicated from a source to a destination computer system, but in other cases, edges of a graph may additionally or alternatively represent a different characteristic of communication between respective pairs of nodes in the graph such as a flow of network traffic from the source to the destination. A "net" flow of traffic is a predominant direction of transfer of communicated data such as payload data in network communication, recognizing that network communication can be bidirectional including at least the negotiation, setup and/or configuration of a communication by way of protocol messages to achieve the delivery of a payload or portion of data as the substantive subject of the communication. For example, network communication corresponding to a request for a web-page by a web-browser being communicated to a web-server will involve communication of the request from the browser to the server with the substantive data transfer being realized as the communication of the web-page content from the server to the browser. Thus, the net flow is from the server to the browser and can be determined, in this example, based on the volume of data transferred. Other mechanisms to determine the net flow of data can be employed including mechanisms that infer the direction of net flow of data based on an analysis, inspection or other identification of the data to determine the substantive part of a communication between computer systems.

FIG. 2 further includes a vector generator 206 as a hardware, software, firmware or combination component arranged to generate a vector representation 208 of communication for each node in the first graph 204. In one example, the vector generator 206 uses Word2Vec or, in some embodiments, Node2Vec which uses node identifiers as words and paths through the first graph 204 as sentences into a typical Word2Vec model ("On Generalizing Neural Node Embedding Methods to Multi-Network Problems", Heimann and Koutra, 2017). The paths can be generated by random walks (traversals of the graph) for a node in the first graph 204, as will be described in more detail later. Due to the non-deterministic nature of Node2Vec (arising because it employs random walks to generate a corpus for Word2Vec) it can be advantageous to combine a plurality of such random walks to generate a representative vector for a node, the representative vector being defined based on a combination of the plurality of walks of the graph for a node (the node representing a computer system). Combining multiple vector representations into a single representation can be achieved using a simple average vector. Alternatively, an orthogonal transformation vector for each of a plurality of pairs of vector representations for the node can be generated such that the orthogonal transformation vector transforms a first vector in each pair to a second vector in the pair. A linear optimization process operating on the orthogonal vectors by, for example, linear regression, can be used to define a combination vector representation for a node in the first graph 204. Thus, in this way, the example of FIG. 2 generates first vector representations 208 for each node in the first graph 204 (which in this case is for a first one of a first plurality of time periods).

The arrangement of FIG. 2 generates first vector representations for each of the computer systems in the set 200 for a second one of a first plurality of time periods in a similar manner. The graph generator 202 generates a second graph 212 representing communication between computer systems in the set 200 for the second one of the first plurality of time periods. Each of at least a subset of the computer systems in the set 200 is provided as a node in the second graph 212 with communications therebetween represented as weighted directed edges in the second graph 212. Although FIG. 2 depicts two instances of the graph generator 202 it is to be appreciated that in some cases the same graph generator 202 may be used to generate both the first graph 204 and the second graph 212. The second graph 212 is comparable with the first graph 204 by way of the first vector representations for each of the computer systems. Thus, the vector generator 206 is operable to generate a first vector representation 216 of the second graph 212 for each node in the second graph 212. As for the graph generator 202, although FIG. 2 depicts two instances of the vector generator 206 it is to be appreciated that in some cases the same vector generator 206 may be used to generate the first vector representations for both the first and second ones of the first plurality of time periods.

The first vector representations 208, 216 can be compared, for each computer system, using a vector similarity function 218 such as a cosine similarity function for comparing vectors as is known in the art. In this way, behavior of a computer system at a first temporal resolution (corresponding to the first duration of each of the first plurality of time periods) can be identified 220. Where the first vector representation 216 for the second one of the first plurality of time periods for a node in the second graph 212 corresponding to a computer system in the set 200 is sufficiently dissimilar to the first vector representation 208 for the first one of the first plurality of time periods for a node in the first graph 204 corresponding to the same computer system, then an anomaly is identified at the first temporal resolution. Sufficiency of dissimilarity (or similarity) can be predetermined in terms of a degree of difference characterized in dependence on the particular vector similarity function 218 employed, such as an angular difference, an extent of vectoral magnitude difference or a combination or other such characterizations of difference as will be apparent to those skilled in the art. In this way, differences in behavior between a time period prior to an attack (e.g. prior to a Distributed Denial of Service (DDoS) attack), which for example corresponds to the first one of the first plurality of time periods, and a time period during the attack, which for example corresponds to the second one of the first plurality of time periods, can be identified.

This process may be repeated for a plurality of different ones of the first plurality of time periods, e.g. for a plurality of different pairs of the first plurality of time periods. In such cases, a comparison of first vector representations for adjacent ones of the first plurality of time periods for a particular computer system may be performed to identify changes in behavior of the particular computer system over time.

In some cases, though, the comparison may be performed for non-adjacent ones of the first plurality of time periods. In other words, the comparison may be performed for two different ones of the first plurality of time periods, which are separated from each other in time by at least one other one of the first plurality of time periods. This for example allows behavior to be identified that occurs periodically. For example, a computer system may exhibit particular behavior for the same hour each day. This behavior may be identified by comparing time periods with a duration of one hour at the same time on different respective days. If the behavior of the computer system for a particular hour on a given day deviates from the behavior of that computer system for that particular hour on other days (which e.g. corresponds to usual behavior of that computer system for that time of day), the behavior of the computer system can be identified as anomalous. Such behavior could be missed if the comparison is only performed for adjacent time periods. In some cases, respective ones of the first plurality of time periods may overlap each other, so as to create a sliding window over which the behavior of the computer system is determined.

In examples, this process is also repeated for each of the second plurality of time periods, which are of a second duration different from the first duration of each of the first plurality of time periods. In this way, a second vector representation may be obtained for each node of a graph, where each node corresponds to a particular computer system in the set 200. In these examples, rather than comparing a second vector representation of a given one of the second plurality of time periods with a first vector representation of a given one of the first plurality of time periods for a particular node (corresponding to a computer system), the second vector representation of the given one of the second plurality of time periods is instead compared with a second vector representation of a different one of the second plurality of time periods (which is e.g. an adjacent or non-adjacent one, and which may be partially overlapping), to identify behavior of the computer system at a second temporal resolution (corresponding to the second duration of each of the second plurality of time periods).

As different attacks are typically carried out over different timescales, identification of behavior of a particular computer system over the first and/or second temporal resolutions allows different attacks to be identified, which may otherwise be missed. For example, a network attack such as a DDoS attack may lead to a noticeable change in behavior on a minute-long scale. However, this change in behavior may be less noticeable on an hour-long, or day-long scale. In some cases, the first duration (of each of the first plurality of time periods) is shorter than the second duration (of each of the second plurality of time periods) and at least one of the first plurality of time periods overlaps one of the second plurality of time periods. For example, where the first duration is a minute and the second duration is an hour, the behavior of the particular computer system may be identified over a minute-long scale that overlaps an hour-long scale over which the behavior of the particular computer system is also identified. Use of different temporal resolutions increase the granularity, providing further insight into the behavior of the particular computer system.

Based on the behavior of a particular computer system (which may be considered a target computer system) over the first and/or second temporal resolutions, anomalous behavior of the particular computer system can be identified. Identification of the anomalous behavior may involve determining whether a change in first vector representations and/or second vector representations for the particular computer system satisfies a predetermined condition. For example, if the change in the first and/or second vector representations exceeds a particular amount, or if the change persists over a predetermined number of ones of the first and/or second plurality of time periods, the behavior may be identified as anomalous.

In some cases, the behavior of each of a plurality of different computer systems in a set may be determined in a similar manner, at a first and/or a second temporal resolution. In such cases, identifying anomalous behavior of a particular computer system (which may be considered to be a target computer system), may be further based on the behavior of at least one other computer system at the first and/or second temporal resolutions. For example, anomalous behavior of the particular computer system may be identified if the behavior of the particular computer system at a given temporal resolution differs appreciably from that of the at least one other computer system, e.g. if the output of the vector similarity function for the particular computer system differs from that for the at least one other computer system by an amount which meets or exceeds a threshold.

Protective measures 220 can be implemented to protect one or more of the computer systems in the set 200 of intercommunicating computer systems in dependence on the detection of an anomaly based on the behavior identified 220 at the first and/or second temporal resolution. In some examples, the protective measures 220 include identifying the N-most anomalous computer systems of the set 200, where N is an integer, which may for example involve ranking the behavior of each of the computer systems of the set 200 from least to most anomalous. It is to be appreciated that the behavior may be ranked in various ways, e.g. depending on the magnitude of the change in behavior at a particular temporal resolution (with a greater magnitude in change, e.g. corresponding to a greater a degree of difference in a vector similarity function, indicating more anomalous behavior), depending on how long particular behavior persists (e.g. over how many of the first and/or second plurality of time periods the behavior is observed in) and/or depending on whether the behavior is observed at a plurality of different temporal resolutions (e.g. at both the first and second temporal resolutions). In examples, anomalous behavior at a particular temporal resolution may be prioritized (or otherwise identified as more likely to indicate a severe security threat) compared to anomalous behavior at another temporal resolution. For example, if it is identified that a first computer system has anomalous behavior over a timescale of minutes, whereas a second computer system has anomalous behavior over a timescale of days, the behavior of the first computer system may be identified as more anomalous than that of the second computer system on the basis that the behavior of the first computer system is anomalous at a temporal resolution of minutes (which may e.g. indicate a network attack). This may be the case even if the magnitude of the anomaly in behavior of the second computer system is greater than that of the first computer system (although, in other examples, the magnitude of the anomalies may additionally or alternatively be taken into account). It is to be appreciated that these are merely examples, though, and the manner in which behavior of computer systems is ranked (if such ranking is performed) is not limited to these examples. Where a ranking is performed, the protective measures 220 may be prioritized based on the ranking of each computer system, to apply protective measures 220 more rapidly to higher-ranked computer systems and/or to apply more stringent protective measures 220 to higher-ranked computer systems.

In some cases, the protective measures 220 include notifying an analyst of anomalous computer systems, e.g. the N-most anomalous computer systems. This for example allows the analyst to investigate the behavior of the identified computer systems and take additional or alternative protective measures than those which may be performed automatically.

Figure 3:
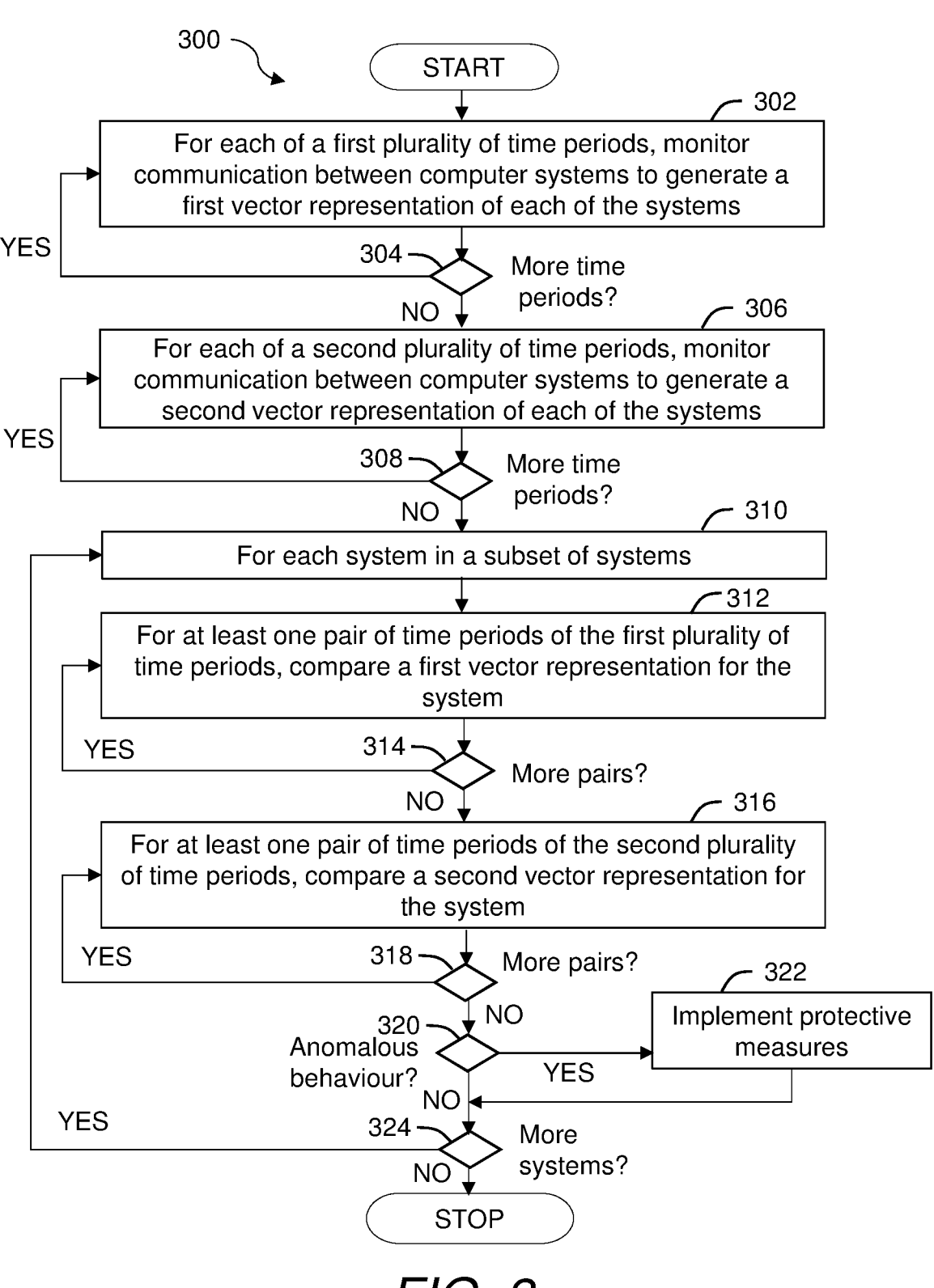
FIG. 3 is a flowchart of a method for identifying anomalous behavior of a computer system in a set of intercommunicating computer systems according to examples.

FIG. 3 is a flowchart of a method 300 for identifying anomalous behavior of a computer system in a set of intercommunicating computer systems in accordance with examples herein. Initially, at items 302 to 304, communication between computer systems in the set 200 is monitored to generate a first vector representation of each of the computer systems for each of a first plurality of time periods (each of a first duration). At items 306 to 308, communication between computer systems in the set 200 is monitored to generate a second vector representation of each of the computer systems for each of a second plurality of time periods (each of a second duration, which is different from the first duration). As explained with reference to FIG. 2, the first and second vector representations may be generated based on first and second graph representations of communications between the computer systems during respective ones of the first and second plurality of time periods, respectively. For example, the first and second vector representations may be generated based on at least one walk of first and second graph representations, as further explained with reference to FIGS. 4 and 5.

At items 310 to 324 of FIG. 3, first vector representations for each of at least one pair of time periods of the first plurality of time periods are compared and second vector representations for each of at least one pair of time periods of the second plurality of time periods are compared for each of a plurality of computer systems in at least a subset of the set 200 of computer systems, to identify behavior of each of the plurality of computer systems in at least the subset at a first temporal resolution and a second temporal resolution, respectively. To facilitate the comparison(s) of item 312 of FIG. 3, a suitable data structure (such as a table) may be used to store a representation of each computer system (such as a suitable identifier) along with the first vector representations for each of the at least one pair of time periods. The comparison(s) of item 312 may be performed by applying a vector similarity function to respective pairs of first vector representations of the data structure. A similar data structure may be used to store the second vector representations (or the same data structure may be used to store both the first and second vector representations), and the comparison(s) of item 316 may be performed in a similar manner to the comparison(s) of item 312, but to identify behavior of each respective computer system at the second temporal resolution instead of the first temporal resolution.

In FIG. 3, when anomalous behavior of a computer system is detected at item 320, based on at least one of the comparisons of items 312 and 316, protective measures are implemented at item 322. As explained above, detection of the anomalous behavior may involve ranking the behavior of the computer systems in at least part of the set 200 from the most to the least changed behavior (or from the most to the least anomalous behavior), based on the comparisons of items 312 and 316. For example, a score may be determined for each computer system based on the comparisons of items 312 and 316, and used to rank the behavior of each computer system. The protective measures of item 322 may include generating an output data structure (such as a table) including details of the computer system(s) that are identified as behaving anomalously and/or of the N computer systems that are identified as having the most anomalous behavior. The information stored in the output data structure may include, for each computer system identified as behaving potentially anomalously, communication data representative of communications between the computer system and at least one further computer system of the set 200, at least one characteristic of a communication between the computer system and the at least one further computer system (such as a volume of data communicated), the score determined for the computer system, and/or whether the computer system was previously included within the output data structure (e.g. whether the computer system has previously been identified as behaving in a manner that is potentially anomalous). In examples in which the output data structure includes communication data, the communication data may be stored as a series of events, each corresponding to the transfer of data between the computer system and another computer system of the set 200. For each event, an identifier of the source of the communication (e.g. the source Internet Protocol (IP) address) and an identifier of a destination of the communication (e.g. the destination IP address) may be stored, along with, in some cases, at least one characteristic of the communication. As communication may be bidirectional, the computer system identified as potentially having anomalous behavior may be the source or the destination of the communication. Information such as this about computer system(s) that are identified as behaving potentially anomalously may be processed to generate a visualization of the behavior of at least part of the set 200, for display using a graphical user interface (GUI) as described further with reference to FIGS. 7 and 8.

Thus, examples herein seek to identify a computer system in the set 200 exhibiting a behavior change detectable at one or more of a first or second temporal resolution (e.g. over a first and/or second timescale), which may be indicative of anomalous behavior of the computer system. FIGS. 4*a*, 4*b* and 4*c* depict exemplary graph data structures representing intercommunicating computer systems in accordance with examples herein. Specifically, FIGS. 4a, 4b and 4c depict graph representations of network traffic for a set of computer systems at different time points. In FIGS. 4a and 4b, computer "A" is showing "normal" behavior (that is, typical behavior for itself), whereas in FIG. 4c, computer "A" is "attacking" several computers, so is exhibiting anomalous behavior. FIGS. 4a, 4b and 4c each represent intercommunicating computer systems (e.g. in a set such as the set 200 of FIG. 2) for different respective ones of a plurality of first time periods. It is to be appreciated that similar graph data structures are generated for different respective ones of a plurality of second time periods in examples herein.

Each edge (arrowed) in FIGS. 4a to 4c is a flow of traffic between a source and a destination computer and the weight (thickness) represents a characteristic of the communication between the source and destination (which in this case may be considered to be an attribute of the flow). This attribute can be the number of connections/flows between two computers, the number of bytes or packets sent or an aggregation of these. In the example of FIG. 4c the number of simultaneous flows between computer "A" and others has increased (hence the thicker arrows). As this behavior was not observed before it is likely that an attack (for example a denial of service attack) is occurring.

To identify this anomalous behavior, examples herein employ machine learning techniques such as Node2Vec to convert each graph into an embedding so that differences in a node at a particular temporal resolution can be measured between embeddings. Node2Vec is a version of Word2Vec which uses node identifiers as words and paths through a graph as sentences in a Word2Vec model. The paths are generated by random walks from each node in a graph. These random walks can be configured to walk close to neighboring nodes (akin to breadth-first search) or walk across the structure of the graph (akin to depth-first search). A next step to take in a walk can be determined by edge probabilities. These probabilities can be calculated by an attribute of an edge (which for example corresponds to a characteristic of communication), such as by normalizing the attribute among all edges and applying the breadth/ depth-first search configurations. For example, an edge probability may be taken as the characteristic of communication or the normalized characteristic of communication. In the context of monitoring computer behavior, attacks may be more likely to occur in respect of neighboring computer systems rather than systems on the other side of a network. Therefore, a larger breadth-first search parameter can be employed, for example.

A characteristic of communication for respective edges (each corresponding to a respective pair of computer systems in a set) can be normalized in various ways. In one examples, an input characteristic of communication (corresponding to the characteristic of communication prior to normalization) is normalized based on an average of the input characteristic of communication for pairs of computer systems of the set and a dispersion of the input characteristic of communication for the pairs. In some cases, the average and dispersion are calculated for each pair of computer systems of the set but in other cases, the average and dispersion are calculated for a subset of pairs of computer systems of the set, such as a representative sample or a subset of pairs that satisfy particular criteria. For example, the average and dispersion may be calculated using a subset of pairs for which the input characteristic of communication satisfies a particular condition, to remove outlying values that may be erroneous and that may otherwise distort the average and dispersion values calculated. By normalizing the input characteristic of communication using both the average and the dispersion, anomalies can be more effectively preserved than by use of the average alone for normalization.

In one example, the average is the mean and the dispersion is the standard deviation. In this example, the input characteristic of communication can be normalized by subtracting the mean from the value of the input characteristic of communication and then dividing the result of the subtraction by the standard deviation, to generate the characteristic of communication. This may be referred to as a Z-score, which is a numerical measurement indicative of the relationship of a value to the mean of a distribution of values.

In another example, the Z-score is calculated for a particular characteristic of communication, and is taken as a first normalized characteristic. A second normalized characteristic is obtained based on the first normalized characteristic such that a relationship between the first and second normalized characteristics is expressible as:

$$C_2 = AC_1 + B$$

where $C_1$ is the first normalised characteristic, $C_2$ is the second normalised characteristic, A is a first constant, and B is a second constant. In this example, the second normalized characteristic corresponds to a T-score, which provides a further indication of how much a particular value varies from the mean of a distribution of values. In a particular example, A is 10 and B is 50, although this is not intended to be limiting.

The following table illustrates an example of characteristics of communication for a particular computer system in a set of computer systems including 7 other computer systems (with node identifiers from 111 to 777). The table shows the number of packets the particular computer system sends to each other computer system in the set and the number of connections the particular computer system has with each other computer system in the set for a particular time period (e.g. one of the first or second plurality of time periods), as well as the Z-score and T-score values for the number of packets and the number of connections:

| Node ID | No. packets (P) | Z-score for no. P | T-score for no. P | No. connections (C) | Z-score for no. C | T-score for no. C |
|---|---|---|---|---|---|---|
| 111 | 550 | 2.4 | 74 | 2000 | −0.9 | 41 |
| 222 | 7 | −0.9 | 41 | 4000 | −0.08 | 49 |
| 333 | 85 | −0.5 | 45 | 8500 | 1.7 | 67 |
| 444 | 100 | −0.4 | 46 | 400 | −1.5 | 35 |
| 555 | 115 | −0.3 | 47 | 4000 | −0.08 | 49 |
| 666 | 130 | −0.2 | 48 | 6540 | 0.9 | 59 |
| 777 | 145 | −0.1 | 49 | 4000 | −0.08 | 49 |

In this example, the mean number of packets is 162 and the standard deviation of the number of packets is 164. The mean number of connections is 4206 and the standard deviation of the number of connections is 2489. Hence, in this example, a Z-score of 2.4 or a T-score of 74 may be used instead of the raw number of packets for node 111 and/or a Z-score of −0.9 or a T-score of 41 may be used instead of the raw number of connections for node 111. Hence, in this example, a characteristic of communication between a node representative of the particular computer system in the graph and a node representative of a different computer system in the set may be taken as the number of packets and/or the number of connections, as a raw number or as a Z-score or T-score.

The net flows of network traffic between pairs of computer systems in a set is directed (as previously described). This direction is carried forward during a random walk which can have an effect on which nodes appear in a path. FIGS. 5a and 5b depict exemplary graph data structures representing intercommunicating computer systems for a particular time period in accordance with examples herein. In the graph of FIG. 5a, node "B" has relatively heavy weighted edges directed to each of nodes "A", "J", "H" and "E" indicating that computer corresponding to node "B" is sending lots of packets to those target computers. During walks of the graph of FIG. 5a as part of the Node2Vec process, only node "C" can result in a traversal to node "B" because only node "C" has an edge directed to node "B". This means the set of paths (corpus) for training Node2Vec for all nodes other than node "C" will not involve node "B", despite node "B" representing the most communicative computer system in the set. To remedy this, all edges and their weights are reversed prior to the walking process of Node2Vec, as illustrated in FIG. 5b. In the exemplary graph of FIG. 5b many more nodes now lead to node "B". During the random walks of the Node2Vec process there is an increased chance of walks involving node "B" meaning the path corpus has a higher chance of mentioning node "B" and thus highlighting the impact node "B" has on the graph.

Word2Vec is used to determine the similarity of words within an embedding. In this process, a similarity score is used on vectors within the embedding. For example, the cosine between two vectors can be calculated which is used to determine how similar (i.e. how parallel) they are. In examples herein, however, each node is to be compared across a set of graph embeddings (each corresponding to a different respective time period).

A problem in using Node2Vec is it is a non-deterministic algorithm because it uses random walks to generate the corpus for Word2Vec. This means that every time Node2Vec is used on the same graph with the same parameters, different embeddings can be generated. For effective comparison of vectors to determine anomalies, Node2Vec can operate deterministically producing consistent embeddings no matter how many executions are performed. This would also mean obtaining a similarity score for the same node among all embeddings for a particular time period should reveal an identical or, at least, much more similar score, for example, using cosine similarity should yield a score tending towards one.

One possible solution to this challenge is to use a different walking strategy known as graph kernelling. Alternatively, a sample average can be calculated from a set of embeddings.

Random walking is integral to Node2Vec and for its intended purpose of producing one embedding for a graph, it suits most needs. However, for larger graphs where there are many possible paths, this strategy may be unsuitable. Even increasing a number of iterations during an execution (i.e. the number of walks performed from each node) may not improve the embedding as the training phase is built on previous walks. Another walking strategy could be used, especially if it can be built on hidden Markov models as this is how the graph is constructed as an input to Node2Vec ("What is a Hidden Markov Model?", Sean R Eddy, Nature Biotechnology volume 22, pages 1315-1316, 2004).

Combining of embeddings is considered in "Linear Ensembles of Word Embedding Models" (Muromägi et al, 2017) where an ensemble is created for performing Word2Vec tasks on a small corpus. The technique in Muromägi of combining embeddings (matrices) through a process called "orthogonal Procrustes" leads to more accurate representations of combined embeddings compared to least squares regression. Orthogonal Procrustes produces an orthogonal matrix, given matrices A and B, so that A can be transformed to (closely match) B. As there are multiple matrices to be combined and one matrix is to represent all of them, this process can be adapted into a linear optimization problem so that the process can be run iteratively to produce a matrix as an embedding rather than an orthogonal matrix. Thus, in the above described examples, combining vector representations into a single vector representation for a node can be performed by generating an orthogonal transformation vector for each of a plurality of pairs of vector representations for the node such that the orthogonal transformation vector transforms a first vector in the pair to a second vector in the pair. Linear optimization is then performed on the orthogonal transformation vectors by linear regression. Thus, the different embeddings from each Node2Vec iteration on the same graph and parameters can be combined to produce a representative embedding of the graph (where the embedding includes a collection of vectors, each corresponding to different respective nodes).

To evaluate the behavior of a particular computer system at a first temporal resolution, first vector representations (e.g. corresponding to embeddings) are compared for different respective ones of a first plurality of time periods. Similarly, second vector representations (e.g. corresponding to embeddings) are compared for different respective ones of a second plurality of time periods to evaluate the behavior of the computer system at a second temporal resolution. A comparison of embeddings can be used to show how a node (corresponding to a particular computer system) has changed behavior (how the edges have changed) between different respective ones of the first or second plurality of time periods. Since an embedding is a collection of vectors, the vectors of the same word (i.e. node having a node identifier) from each embedding are compared against each other using the vector similarity function to identify change in the behavior of the node between the time periods corresponding to each embedding. For example, a cosine similarity can be used to show how parallel two vectors are—parallel vectors have a score of 1, perpendicular vectors have a score of 0 and opposite-facing vectors have a score of −1. Other similarity scores can be used as will be apparent to those skilled in the art.

For example, network traffic can be collected for a time window, such as 24 hours. The 24 hours of data can be divided into 24 observations (i.e. one per hour), and the 24 observations can each be further sub-divided into 60 further observations (i.e. one per minute). In this way, 1,440 minute-by-minute observations can be obtained and 24 hour-by-hour observations can be obtained. In this case, each minute can be taken as a respective one of a first plurality of time periods (each with a duration of a minute) and each hour can be taken as a respective one of a second plurality of time periods (each with a duration of an hour). Each of the minute-by-minute observations can be converted into a first graph, respectively, in which each node represents a computer system in the set 200 and each edge represents a property of a connection between two systems. Some properties can include the number of connections made, number of packets or bytes sent or some other suitable observable property. Similarly, each of the hour-by-hour observations can be converted into a second graph, respectively, in which each node represents a computer system in the set 200 and each edge represents a property of a connection between two systems. Each first graph and each second graph can then be processed iteratively through Node2Vec with the resulting vectors merged by the Procrustes mechanism to produce a representative embedding of each of the first and second graphs. As explained above, the embeddings of the first and second graphs each include first and second vector representations, respectively, for computer systems of the set, where each first vector representation corresponds to a different respective minute and each second vector representation corresponds to a different respective hour. In other words, a particular embedding of the first graph (corresponding to a particular minute) includes first vector representations for respective computer systems of the set, each indicative of the behavior of the respective computer system for the particular minute.

A generated embedding for a first minute is compared with the embedding of a subsequent minute using a similarity function as previously described. For each node in the embeddings a similarity score will show how much a computer system represented by the node has changed behavior from minute to minute. If cosine similarity is used, a score close to 1 means the node did not change behavior (constant connections maintained), whereas a score closer to −1 means the node dramatically changed behavior, possibly meaning it was performing an attack. A generated embedding for a first hour is similarly compared with the embedding of a subsequent hour, to identify changes in behavior of the computer system from hour to hour. Based on the minute to minute and/or hour to hour behavior, it is identified whether the behavior of the node changed appreciably and hence whether the behavior is anomalous (e.g. indicating a potential attack). Where an attack is indicated, reactive measures can be employed such as the protective measures previously described.

In some cases, a particular computer system of a set of computer systems 200 may commence communication partway through a time window over which behavior of the set of computer systems 200 is to be investigated. The commencement of communication of a particular computer system may be due to a cyber security breach such as a Botnet attack, or may be benign in nature. FIGS. 4a to 4c illustrate an example in which a particular computer system begins to communicate with the remainder of a set 200 partway through a time window. The node "E" is not in communication with the other nodes of the set in the time periods corresponding to FIGS. 4a and 4b, but is then in communication with the node "J" in the time period corresponding to FIG. 4c. For a first sub-window of a time window in which a particular computer system is not in communication with the remainder of the set 200, it can be difficult to generate a suitable vector representation of the particular computer system for comparison with a vector representation of the particular computer system after the particular computer system has commenced communication with at least one computer system of the set 200, e.g. in a second sub-window of the time window, subsequent to the first sub-window. For example, a default vector representation could be used for the particular computer system in the first sub-window, such as a null vector representation. However, such an approach may lead to any commencement of communication between the particular computer system and the remainder of the set 200 being identified as potentially anomalous (even if it is, in fact, benign).

To address this, some examples include the generation of dummy data, representing dummy communication between the particular computer system and at least one computer system of the reminder of the set 200, for the first sub-window. The dummy communication is for example generated based on communication between computer systems in the remainder of the set within the first sub-window and communication between the particular computer system and at least one further computer system in the remainder of the set within the second sub-window. The dummy communication generated can then be used to generate at least one of the first and/or second vector representations of the particular computer system (for respective one(s) of the first and/or second plurality of time periods that are within the first sub-window). With this approach, a first one of the first vector representations (based on the dummy communication) corresponding to a first one of the first plurality of time periods within the first sub-window can be compared to a second one of the first vector representations (based on actual communication of the particular computer system with at least one further computer system) corresponding to a second one of the first plurality of time periods within the second sub-window. This approach may be applied similarly to compare a first one of the second vector representations (based on the dummy communication) corresponding to a first one of the second plurality of time periods within the first sub-window with a second one of the second vector representations (based on actual communication of the particular computer system with at least one further computer system) corresponding to a second one of the second plurality of time periods within the second sub-window. This approach allows a more accurate determination to be made as to whether the communication of the particular computer system in the second sub-window is genuinely anomalous, based on expected behavior of the particular computer system in the first sub-window (if the particular computer system had been in communication with other computer system(s) of the set 200 in the first sub-window), at one or more of the first or second temporal resolutions.

FIG. 6 shows a flowchart of a method 600 for generating dummy data for use in identifying anomalous behavior of a computer system in a set of intercommunicating computer systems according to examples. At item 602 of the method 600, commencement of communication, within a time window, between a particular computer system of a set and at least one further computer system of a remainder of the set is identified. The time window thus has a first sub-window prior to the commencement, and a second sub-window after the commencement. The time window for example includes at least one of the first or second plurality of time periods discussed in other examples herein. The commencement of communication may be identified based on data representative of communications between various computer systems in the set. Such data may for example be log data, e.g. in the form of NetFlow records. The commencement may be identified by a particular computer system (e.g. corresponding to a particular IP address) newly appearing within the data, i.e. so that the particular computer system is absent from entries of the data within the first sub-window, but is present in at least one entry of the data within the second sub-window.

At item 604 of the method 600, an average number of communication events per computer system in the remainder of the set (i.e. other than the particular computer system which is not communicating within the first sub-window) is determined for the first sub-window, based on the communication between these computer systems. A communication event associated with a given computer system is for example an instance of communication involving the computer system (i.e. with the given computer system either receiving or sending the communication). For brevity, a communication event may be referred to herein merely as a communication. For example, a communication event may correspond to an entry of a log file storing network events, such that each entry corresponds to a respective event. With reference to FIG. 4*a*, the computer system associated with the node "F" receives a communication from the computer system associated with the node "G" and sends a communication to the computer system associated with the node "C". Each communication may for example correspond to packets of data or other network traffic. In this example, each of these communications may correspond to a different respective log entry, and may hence be considered to correspond to a different respective communication event.

Referring back to FIG. 6, at item 606 of the method 600, an average characteristic of communication between pairs of computer systems in the remainder of the set is determined for the first sub-window, based on the communication between these computer systems. As explained above, the characteristic of communication may include at least one attribute of the communication such as a volume of data communicated and/or a flow of network traffic.

At item 608 of the method 600, communication between the particular computer system and the at least one further computer system within the second sub-window is selected based on the average number of communication events identified at item 604. For example, a predetermined number of communications (e.g. communication events) of the communication between the particular computer system and the at least one further computer system may be selected. In one case, the predetermined number of communications corresponds to the average number of communication events. In this way, an average number of communications can be selected to use as the dummy communication for the particular computer system within the first sub-window, so that the dummy communication represents average behavior (which is e.g. non-anomalous), for comparison to the actual behavior of the particular computer system within the second sub-window.

In some cases, the communications are selected based on both the average number of communications and the average characteristic of communication. For example, the communication between the particular computer system and the at least one further computer system within the second sub-window may be ranked based on the average characteristic, e.g. so that communications that are most likely to be non-anomalous (e.g. with characteristics that are less than or equal to the average characteristic) can be selected for the dummy communication. In other cases, though, this may be omitted, e.g. if the characteristic of communication for the selected communications is modified to more closely conform with average behavior during the second sub-window (as described further below with reference to item 614 of FIG. 6).

At item 610 of the method 600, for each communication selected at item 608, the characteristic of communication for that particular communication is compared to the average characteristic of communication determined at item 606. At item 612, it is determined whether the characteristic satisfies a condition based on the average characteristic. In one example, the condition is satisfied if the characteristic is less than or equal to the average characteristic (or within a particular range of the average characteristic). This condition allows communications with unusual characteristics to be identified, since such communications may be indicative of anomalous behavior, and hence unsuitable for use as dummy communications (without modification), since the dummy communications are intended to capture non-anomalous behavior. If the characteristic fails to satisfy the condition, item 614 of the method 600 involves modifying the characteristic based on the average characteristic. For example, the characteristic can be modified such that, after modification, the characteristic satisfies a condition based on the average characteristic. In the example in which the condition is satisfied if the characteristic is less than or equal to the average characteristic, the modification of item 614 involves setting the characteristic to the average characteristic. This allows genuine communications between the particular computer system and remaining computer systems in the set within the second sub-window to be used as the dummy data for the first sub-window, but with characteristics of communication appropriately adjusted so as to mitigate the effect of anomalous behavior of the particular computer system that may be present in the second sub-window. If, however, the characteristic satisfies the condition at item 612, the characteristic in this case is unmodified. Items 610 to 614 are repeated until each communication selected at item 608 has been processed. At item 618, the communications selected at item 608 (modified at item 614 if the condition is not satisfied) are used as the dummy data for the first sub-window. Items 610 to 618 therefore involve identifying a first subset of the communications identified at item 608 that satisfy the condition (at item 612), a second subset of the communications identified at item 608 that fail to satisfy the condition (at item 612), modifying the characteristic for each of the second subset of the communications (at item 614) and selecting the communications to use as the dummy communications to include the first subset and the second subset (after modification of each of the second subset at item 614).

After the method 600 of FIG. 6, the dummy communications, for example represented as dummy data, may be used to identify behavior of the particular computer system over a time window that includes the first sub-window. Mitigation action may be taken based on the behavior of the particular computer system at a first and/or second temporal resolution, as discussed above. In some cases, though, given the sudden appearance of the particular computer system partway through the time window, certain mitigation action (which may be more limited in scope than otherwise, e.g. generation of notification rather than changing a configuration of the particular computer system) may be performed irrespective of the behavior of the particular computer system at a first and/or second temporal resolution. For example, a suitable alert may be generated indicative of the sudden appearance of the particular computer system (which may be suspicious, and potentially indicative of an attack) and/or the particular computer system may be added to a suitable data structure (such as a list) indicative of potentially anomalous computer systems. For example, a particular computer system that commences communication with the remainder of a set of computer systems may be included on a watch list of potentially anomalous computer systems for a predetermined number of time periods (e.g. a predetermined number of the first or second plurality of time periods). This allows the particular computer system to be monitored closely for anomalous behavior, for example by a human analyst, as an extra precaution.

In an illustrative example in accordance with the method 600 of FIG. 6, two files are obtained, each containing one hour of data. A first file includes the hour of data prior to a Botnet attack, and a second file includes the first hour of the Botnet attack. The Botnet attack is propagated from a particular computer, which is not in communication with remaining computers of a set in the hour prior to the Botnet attack. The first file includes a record of the number of communication events between a source and destination computer within the set, e.g. each corresponding to a different respective event in the first file. For example, the number of times a particular computer appears in the first file (i.e. the number of unique events the particular computer is a participant of) may be taken as the number of communication events. The number of communication events may be determined per computer system, and averaged across the number of computer systems to obtain the average number of communication events per computer system. In this example, the average number of communication events is a mean, which is calculated by dividing the sum of unique appearances of respective computer systems in the first file by the number of unique computer systems in the set. In this case, the average number of times a particular computer system appears in the first file is 12 times, which is taken as the average number of communication events.

It is to be appreciated that this is based on an assumption that each computer system of the set should behave similarly, and that a relatively high number of communication events associated with a particular computer system is likely to suspicious. However, there may be certain sets in which at least one computer system is expected to behave differently from other computer systems in the set. For example, a computer system acting as a super user would be expected to be associated with a significantly higher number of communication events. To mitigate this, as explained above, the average number of communication events may be determined from a subset of computer systems, e.g. using only those computer systems with particular IP addresses, or to exclude certain computer systems such as those acting as super users. In cases in which a particular computer system is expected to exhibit different behavior than other computer systems, the particular computer system may be flagged or otherwise identified, e.g. such that a different criterion can be used in assessing whether behavior of the particular computer system is anomalous than that used for assessing the behavior of other computer systems. In further examples, data such as that of the first file may be divided into portions which each have similar features. For example, if half of the computer systems represented by the first file are associated with around 300 communication events and the other half are associated with around 2 communication events, the data of the first file can be divided into two and the appropriate portion of the data of the first file can be used to obtain the average number of communication events.

In this illustrative example, the first file also includes a record of the number of connections between a particular source and destination computer within the set. An average (in this example, a mean) is calculated from this record, to identify that each computer has on average 1.87 connections with another particular computer per hour (which can be rounded to 2 connections). In other words, based on the first file, it is determined that each computer has on average 12 communications per hour, and that each computer communicates, on average, twice with each particular destination computer.

In this illustrative example, the second file is then processed to identify all the communications associated with a particular computer that has newly begun to communicate with the remainder of computers in the set (and which, in this case, is perpetrating a Botnet attack). The communications are sorted by the number of connections, and the 12 communications (i.e. the average number of connections determined using the first file) with the lowest number of connections are selected. Each of the 12 communications are checked to see that the number of connections is less than the average value calculated using the first file (i.e. less than 2). If the number of connections is greater than 2 for a given communication, the number of connections is changed to 2 for that communication. Finally, the 12 communications (after modification of the number of connections, if needed) are used as dummy data for the first hour, in this case by adding the 12 communications to the first file.

Figures 7, 8:
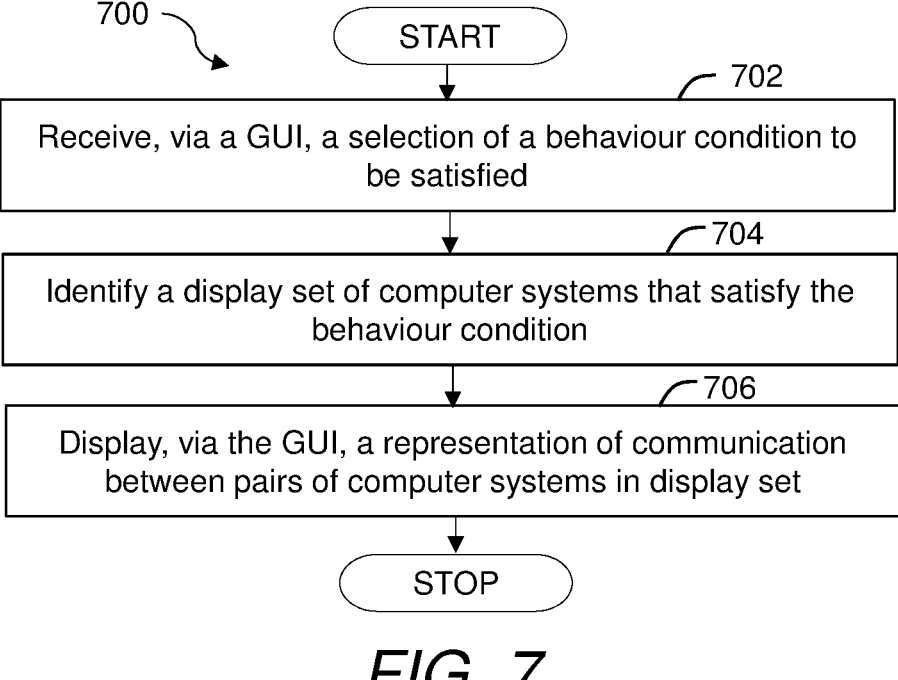
FIG. 7 is a flowchart of a method for displaying a representation of communication between pairs of computer systems according to examples.
FIG. 8 is a schematic diagram illustrating display of a graphical user interface via a display according to examples.

FIG. 7 is a flowchart of a method 700 for displaying a representation of communication between pairs of computer systems. At item 702 of the method 700, a selection of a behavior condition to be satisfied is received, via a graphical user interface (GUI). The behavior condition may be used to identify computer systems of a set with behavior that is likely to be anomalous, e.g. so that these computer systems can be visualized using the GUI. At item 704 of the method 700, a display set of computer systems that satisfy the behavior condition is identified based on the behavior of a plurality of computer systems of the set at a first and/or second temporal resolution, where the behavior may be determined using any of the methods herein. At item 706 of the method 700, a representation of communication between pairs of computer systems in the display set is displayed via the GUI. Use of the GUI facilitates the making of a selection of computer systems to be displayed, for example so that suitable mitigating action can be performed for the selected computer systems.

In one example, identifying the display set comprises identifying the N-most anomalous computer systems of the set, where N is an integer. In another example, the behavior condition indicates a temporal resolution over which the anomalous behavior is to be identified. For example, item 702 of the method 700 may include receiving a selection of this temporal resolution, via the GUI. In this example, the identifying the display set comprises identifying the display set based on the behavior of the computer systems of the set at either the first temporal resolution or the second temporal resolution, based on the temporal resolution indicated by the behavior condition. This example may be combined with the previous example, so as to display the N-most anomalous computer systems of the set based on behavior of the computers over either the first temporal resolution or the second temporal resolution. Examples in which the behavior condition indicates the temporal resolution at which the anomalous behavior is to be identified allows the display set to be toggled based on the behavior condition selected at item 702. For example, a user of the GUI can view a visualization of the computer systems based on behavior at a first temporal resolution, and can subsequently view a visualization of the computer systems based on the behavior at a second temporal resolution. In other cases, the GUI may display a visualization of the behavior of the computer systems at both the first and second temporal resolutions (e.g. in separate windows, or overlaid with each other within the same window).

FIG. 8 is a schematic diagram illustrating display of a GUI 800 via a display device. The GUI 800 includes selection boxes 802a-802c via which a user can select respective behavior conditions and/or other display characteristics for display of the display set to be displayed in a display box 804 of the GUI 800. For example, a first selection box 802a may allow the user to enter a selection of how many different computer systems to display, a second selection box 802b may allow the user to enter a selection of which temporal resolution is to be used for determining whether behavior is anomalous, and a third selection box 802c may allow the user to confirm a selection, or to enter a selection, of mitigating action to be taken in response to anomalous behavior of at least one of the computer systems.

This is not intended to be limiting, though, and the GUI 800 may include further interfaces for the selection of other behavior conditions and/or display characteristics.

In this example, the display box 804 displays a visualization of computer systems 806*a-e* (some of which are labelled in FIG. 8), and communication between pairs of computer systems (indicated as arrows between respective computer systems, with a direction of the arrow indicating the direction of communication, one of which is labelled in FIG. 8 with the reference numeral 808). In FIG. 8, a shape used to represent a particular computer system is used to indicate how anomalous the behavior of the particular computer system has been identified as being. Computer systems (such as the first computer system 806*a*) in the top 10 most anomalous are represented using a diamond shape, computer systems (such as the second and fifth computer systems 806*a*, 806*e*) ranked from $11^{th}$ to $50^{th}$ most anomalous are represented using a square shape, and other computer systems (such as the third and fourth computer systems 806*c*, 806*d*) are represented using a small circle. However, this is merely an example, and other GUIs may indicate behavior of computer systems in a different manner, e.g. using different colors rather than shapes, or a combination of colors and shapes.

A GUI 800 such as that of FIG. 8 may also allow a user to visualize a comparison between non-adjacent time periods, such as the same time period on different days. A GUI 800 may also be used to display a visualization of a behavior of a computer system at different respective temporal resolutions, e.g. with a plurality of windows, such that each window corresponds to a different respective temporal resolution. In such cases, it is to be appreciated that such a GUI may include a suitable interface to allow a user to enter a selection of how the computer systems are to be displayed.

A GUI 800 such as that of FIG. 8 may, in addition, allow a user to control the implementation of protective measures in a straightforward manner. In FIG. 8, the user can provide an indication of one or more computer systems in the set for which protective measures are to be implemented to protect against malicious communication involving the target computer system by selecting a representation of particular computer systems to be protected via the GUI 800. For example, a user may click on or otherwise interact with the representation of the first computer system 806*a* in the display box 804 of the GUI, to indicate that the user wishes to implement protective measures for the first computer system 806*a*. In response to receiving the indication, the protective measures for the one or more computer systems in the set. Use of the GUI 800 in this way hence facilitates more straightforward control over the application of protective measures.

In some cases, the protective measures that are to be implemented are configured by a suitable intrusion response system (IRS). In these cases, the protective measures identified by the IRS as being appropriate for a particular computer system can be implemented automatically if the user provides an indication, via the GUI 800, that protective measures are to be implemented for that particular computer system. This for example simplifies the implementation of the protective measures.

In the example of FIG. 8, though, the GUI 800 includes a third selection box 802*c*, via which a user can provide a further indication of the protective measures that are to be implemented for a particular computer system, as noted above. For example, the third selection box 802*c* may be a drop-down box, via which the user can select one or more options from a predefined list of possible protective measures (although this is merely a non-limiting example, and in other cases, the protective measures that are to be implemented may be indicated in various other ways, including other ways using a GUI such as the GUI 800). In this case, the user can for example select one or more computer systems for which a particular protective measure (such as performance of an antimalware task), selected via the third selection box 802*c*, is to be employed. This provides further control over the security of the set of intercommunicating computer systems.

It is to be appreciated that the methods herein may be used to identify behavior of a target computer system over each of a plurality of temporal resolutions (e.g. over a plurality of timescales) of different durations. For example, the behavior of the target computer system may be identified at a temporal resolution of a minute, an hour, a day, and a month (although this is not intended to be limiting). The temporal resolution at which the behavior of a given target computer system is identified may depend on the threat to be identified, which is e.g. a threat the target computer system is considered to be vulnerable to. If it is unknown which threat(s) a particular target computer system is vulnerable to, the behavior of the target computer system may be identified at a predetermined plurality of temporal resolution of different durations (e.g. a default combination such as a minute, an hour, a day, and a month).

In examples above, multiple Node2Vec executions are used to generate a vector representation of a node in a graph. However, generating multiple vectors for consolidation into a single vector representation and a particular number of vectors required to arrive at a statistically representative combined vector can be difficult to determine (similar to a difficulty in determining a depth of a deep learning network or a number of training examples for a machine learning algorithm to arrive at a suitably trained machine). Furthermore, the use of random walking of the graph results in a lack of certainty that independently generated vector embeddings will be comparable due to the non-determinative nature of the walking process. While the non-determinative nature of the walking process can be suitably mitigated by consolidating a multiplicity of walks, the selection and number of such walks is itself challenging to determine.

Hence, in further examples herein, vector representations such as the first and second vector representations discussed herein are generated based on deterministic walks of a graph representation of communications between computer systems. The use of a reproducible deterministic walk of a graph as a basis for the generation of a vector representation removes a need to combine a plurality of walks of the graph to generate a representative vector representation. Accordingly, the selection of an appropriate number of such walks for combination is also avoided.

Figure 9:
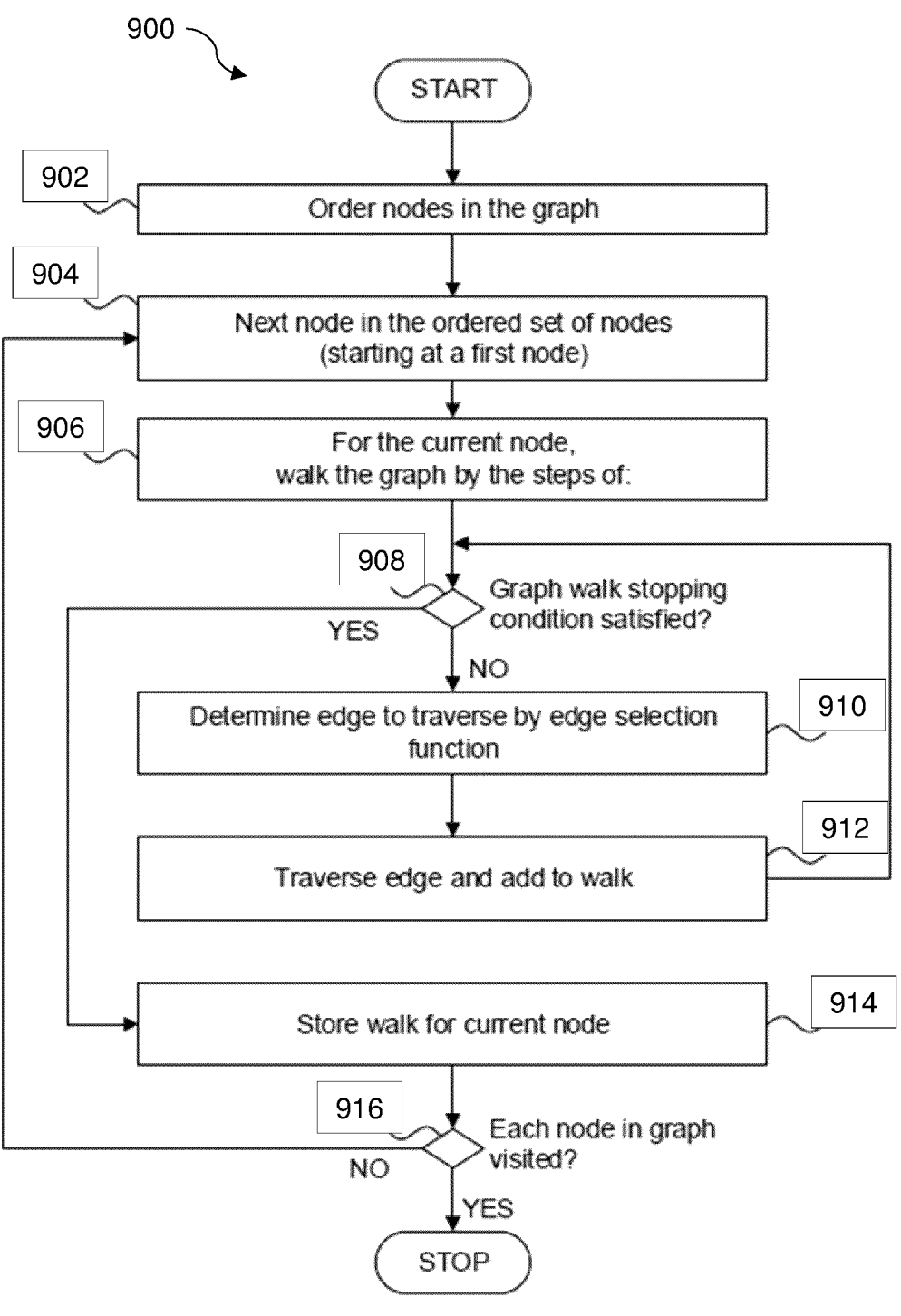
FIG. 9 is a flowchart of a method for generating vector representations for computer systems based on deterministic walks of a graph representation of communications between computer systems according to examples.

FIG. 9 is a flowchart of a method 900 for generating vector representations for computer systems based on deterministic walks of a graph representation of communications between computer systems according to examples herein. In examples, the method 900 of FIG. 9 is applicable to the generation of the first and second vector representations at items 302 and 306 of FIG. 3. For example, the graph representation referred to in FIG. 9 may be a graph representation of a set of computer systems 200 for one of a first plurality of time periods or for one of a second plurality of time periods.

Firstly, at item 902 of FIG. 9, the nodes in at least a subset of the graph (and, in some cases, all nodes in the graph) are ordered using a deterministic ordering function. The nodes may be ordered based on a degree of each node (i.e. a number of edges for each node). Where multiple nodes share the same degree, an ordered differentiation of the nodes can be made based on a characteristic of each node sharing the same degree. For example, a unique identifier of each node can be used to order the nodes, such as by ordering the nodes in order of their identifier using a suitable means (e.g. an alphabetic, alphanumeric or numeric identifier can be readily ordered). Thus, in such examples, the degree of each node constitutes at least part of the basis for determining an order of the nodes.

Subsequently, at item 904, the method 900 proceeds to iterate through nodes in the ordered set of nodes starting with a first node in the ordered set. At item 906, for a current node, a walk of the graph commencing with the current node is undertaken. Thus, the walk is performed for the current node which constitutes the start node of the walk. Such current node is therefore referred to herein as the current start node.

The walk is constituted by the items 908 to 912 of FIG. 9 in which, initially at item 908, determines if a stopping condition for the walk is met. A walk for a start node can stop after a predetermined number of edge traversals (or node visits) in order to limit the maximum length of the walk. Such a limit thus constitutes a stopping condition. Another stopping condition can include a condition that a total weight of all edges from the node exceeds a particular value, such as a total weight must be greater than zero. Other suitable stopping conditions will be apparent to those skilled in the art.

Where the stopping condition is not satisfied the method 900 proceeds to item 910 where an edge to traverse next in the walk is determined based on a deterministic edge selection function. The edge selection function is a function that determines which edge, from a particular node, the walk should take next and is deterministic such that the function always determines the same edge in the same circumstances. In some examples, the edge selection function selects an edge based on weights of edges for a node. For example, the edge selection function identifies the edge having the greatest weight by, e.g., comparing the weights of the edges for the node. In such an example, multiple edges sharing the same weight can be differentiated in an ordered manner by, for example, ordering the nodes to which each edge leads using a characteristic of such nodes. Such a characteristic can be a unique identifier of the nodes so that the nodes can be ordered in a deterministic way so that the edge selection function can identify deterministically which edge should be walked next. Subsequently, at item 912, the determined edge is walked and the method 900 iterates to item 908 until the stopping condition is met.

In some examples, the selection of an edge by the edge selection function at item 910 for traversal of the edge at item 912 further comprises decreasing a weight of the edge so that the weight of the edge when it is traversed reduces. In this way, frequently traversed edges are progressively deemphasized deterministically in terms of the edge selection function for subsequent walks of the graph.

When the stopping condition for a walk of the graph for a current start node is met, the walk for the current start node is stored, recorded or otherwise remembered in association with the current start node at item 914. The method 900 then determines, at item 916, whether each node in the graph has been visited and iterates to item 904 accordingly. Notably, the determination at item 916 could be to determine if all nodes have been used as start nodes. Alternatively, the determination at item 916 is whether all nodes have been visited, such visit being constituted as either a start node or as part of a walk of another node as start node.

Thus the method 900 of FIG. 9 generates, for each node in a set of nodes of the graph (start nodes), a single deterministic walk of the graph for the node on which basis a vector representation can be generated using, for example, Node2Vec or Word2Vec as previously described. The method 900 of FIG. 9 may hence be performed for a plurality of graphs, each representing communications within a set of intercommunicating computer systems over a different respective time period (which may or may not be overlapping), so as to obtain a vector representation of a particular computer system for each of a plurality of first time periods and each of a plurality of second time periods.

It is to be appreciated that, in further examples, the first and second vector representations may be obtained in a different manner that does not involve the walking of a graph representation, as the skilled person will appreciate.

In FIG. 6, both the average number of communication events and the average characteristic of communication are used to generate dummy communications. However, in other examples that may be otherwise similar to the method 600 of FIG. 6, one of the average number of communication events and the average characteristic of communication need not be used. For example, a predetermined number of communications may be selected, rather than selecting a number based on the average number, or the communications may be selected irrespective of the average characteristic of communication. If the communications are selected irrespective of the average characteristic of communication, the characteristic of each communication may be set to a predetermined value which is considered to be indicative of non-anomalous behavior.

Insofar as examples described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium, for example as a computer program element, in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described examples, the disclosure is not limited thereto and that there are many possible variations and modifications which fall within the scope of the claims.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of identifying anomalous behavior of a computer system in a set of intercommunicating computer systems, each computer system in the set being uniquely identifiable, the method comprising:

monitoring communication between the computer systems in the set for a first plurality of time periods to generate, for each of the first plurality of time periods, a first vector representation of each of the computer systems, wherein each of the first vector representations is generated based on at least one walk of a first graph representation of communications between the computer systems during a respective one of the first plurality of time periods, in which nodes of the first graph representation correspond to computer systems in the set and weighted directed edges between the nodes of the first graph representation correspond to a characteristic of communication between pairs of computer systems in the set;

monitoring communication between the computer systems in the set for a second plurality of time periods to generate, for each of the second plurality of time periods, a second vector representation of each of the computer systems, wherein a first duration of each of the first plurality of time periods is different from a second duration of each of the second plurality of time periods, and wherein each of the second vector representations is generated based on at least one walk of a second graph representation of communications between the computer systems during a respective one of the second plurality of time periods, in which nodes of the second graph representation correspond to computer systems in the set and weighted directed edges between the nodes of the second graph representation correspond to the characteristic of communication or a further characteristic of communication between pairs of computer systems in the set;

comparing the first vector representations corresponding to different respective ones of the first plurality of time periods for a target computer system using a vector similarity function to identify behavior of the target computer system at a first temporal resolution corresponding to the first duration;

comparing the second vector representations corresponding to different respective ones of the second plurality of time periods for the target computer system using the vector similarity function to identify behavior of the target computer system at a second temporal resolution corresponding to the second duration;

based on the behavior of the target computer system at one or more of the first temporal resolution or the second temporal resolution, identifying anomalous behavior of the target computer system; and responsive to identifying the anomalous behavior, implementing protective measures for one or more computer systems in the set to protect against malicious communication involving the target computer system.

2. The method of claim 1, further comprising normalizing an input characteristic of communication to determine the characteristic of communication for each respective pair of the pairs of computer systems, wherein normalizing the input characteristic of communication comprises normalizing the input characteristic of communication for each respective pair based on:

an average of the input characteristic of communication for the pairs of computer systems; and a dispersion of the input characteristic of communication for the pairs of computer systems.

3. The method of claim 2, wherein the characteristic of communication is a second normalized characteristic of communication, and normalizing the input characteristic of communication comprises:

normalizing the input characteristic of communication for each respective pair based on the average and the dispersion, to obtain a first normalized characteristic; and obtaining the second normalized characteristic based on the first normalized characteristic such that a relationship between the first normalized characteristic and the second normalized characteristic is expressable as:

$$C_2 = AC_1 + B$$

where $C_1$ is the first normalized characteristic, $C_2$ is the second normalized characteristic, A is a first constant, and B is a second constant.

4. The method of claim 1, wherein the characteristic of communication includes one or more of: a flow of network traffic from a source computer system to a destination computer system; or a volume of data communicated from the source computer system to the destination computer system.

5. The method of claim 1, wherein the first duration is shorter than the second duration and at least one of the first plurality of time periods overlaps one of the second plurality of time periods.

6. The method of claim 1, further comprising:

identifying commencement of communication between a particular computer system of the set and at least one further computer system of a remainder of the set within a time window comprising at least one of the first plurality of time periods or the second plurality of time periods, such that there is a first sub-window of the time window in which the particular computer system is not in communication with the remainder of the set and a second sub-window of the time window, subsequent to the first sub-window, in which the particular computer system is in communication with the at least one further computer system; and generating a dummy communication between the particular computer system and at least one computer system of the remainder of the set for the first sub-window, based on communication between computer systems in the remainder of the set within the first sub-window and the communication between the particular computer system and the at least one further computer system within the second sub-window, wherein at least one of at least one of the first vector representations or at least one of the second vector representations of the particular computer system is based on the dummy communication.

7. The method of claim 6, wherein the target computer system is the particular computer system, and comparing the first vector representations for the target computer system comprises comparing:

a first one of the first vector representations, corresponding to a first one of the first plurality of time periods within the first sub-window, the first one of the first vector representations based on the dummy communication; and a second one of the first vector representations, corresponding to a second one of the first plurality of time periods within the second sub-window, the second one of the first vector representations based on the communication between the particular computer system and the at least one further computer system within the second sub-window.

8. The method of claim 6, wherein the target computer system is the particular computer system, and comparing the second vector representations for the target computer system comprises comparing:

a first one of the second vector representations, corresponding to a first one of the second plurality of time periods within the first sub-window, the first one of the second vector representations based on the dummy communication; and a second one of the second vector representations, corresponding to a second one of the second plurality of time periods within the second sub-window, the second one of the second vector representations based on the communication between the particular computer system and the at least one further computer system within the second sub-window.

9. The method of claim 6, wherein generating the dummy communication comprises:

determining, based on the communication between computer systems in the remainder of the set within the first sub-window, an average characteristic of communication between pairs of computers in the remainder of the set; and selecting, based on the average characteristic of communication, communication between the particular computer system and the at least one further computer system within the second sub-window to use as the dummy communication.

10. The method of claim 9, wherein:

generating the dummy communication further comprises determining, based on the communication between computer systems in the remainder of the set within the first sub-window, an average number of communication events per computer system in the remainder of the set; and selecting the communication comprises selecting, based on the average number and the average characteristic of communication, a predetermined number of communications of the communication between the particular computer system and the at least one further computer system within the second sub-window, as the communication.

11. The method of claim 10, wherein selecting the communication comprises:

identifying a first subset of communications, of the communication between the particular computer system and the at least one further computer system within the second sub-window, with a respective characteristic of communication that satisfies a condition based on the average characteristic of communication;

identifying a second subset of communications, of the communication between the particular computer system and the at least one further computer system within the second sub-window, with a respective characteristic of communication that fail to satisfy the condition based on the average characteristic of communication;

modifying the respective characteristic of communication of each of the second subset of communications such that, after modification, the respective characteristic of communication of each of the second subset of communications satisfies the condition based on the average characteristic of communication; and selecting the communication to comprise the first subset of communications and the second subset of communications, after modification.

12. The method of claim 1, further comprising:

comparing first vector representations corresponding to different respective ones of the first plurality of time periods for each of at least one other computer system of the set, other than the target computer system, using the vector similarity function to identify behavior of each of the at least one other computer system at the first temporal resolution; and comparing second vector representations corresponding to different respective ones of the second plurality of time periods for each of the at least one other computer system using the vector similarity function to identify behavior of each of the at least one other computer system at the second temporal resolution, wherein identifying the anomalous behavior of the target computer system is further based on the behavior of the at least one other computer system at at least one of the first temporal resolution or the second temporal resolution.

13. The method of claim 12, further comprising:

receiving, via a graphical user interface (GUI), a selection of a behavior condition to be satisfied;

identifying, based on the behavior of the target computer system and the at least one other computer system at at least one of the first temporal resolution or the second temporal resolution, a display set of computer systems that satisfy the behavior condition; and displaying, via the GUI, a representation of the communication between pairs of computer systems in the display set.

14. The method of claim 13, wherein identifying the display set comprises identifying the N-most anomalous computer systems of the target computer system and the at least one other computer system at the first and/or second temporal resolutions, based on the behavior of the target computer system and the at least one other computer system at at least one of the first temporal resolution or the second temporal resolution, where N is an integer.

15. The method of claim 13, wherein the behavior condition further indicates a temporal resolution at which anomalous behavior is to be identified, and the identifying the display set comprises identifying the display set based further on the behavior of the target computer system and the at least one other computer system at the first temporal resolution or the second temporal resolution, based on the temporal resolution indicated by the behavior condition.

16. The method of claim 12, further comprising:

receiving, via the GUI, an indication of one or more computer systems in the set for which protective measures are to be implemented to protect against malicious communication involving the target computer system.

17. The method of claim 16, comprising receiving, via the GUI, a further indication of the protective measures that are to be implemented.

18. The method of claim 16, wherein the protective measures include one or more of: preventing network communication to or from a particular computer system; performing an antimalware task on one or more of the computer systems; disconnecting one or more of the computer systems; or increasing a level of monitoring of network communication with one or more of the computer systems.

19. The method of claim 1, wherein comparing the first vector representations comprises comparing first vector representations corresponding to two different ones of the first plurality of time periods for the target computer system using the vector similarity function, wherein the two different ones of the first plurality of time periods are separated from each other in time by at least one other one of the first plurality of time periods.

20. The method of claim 1, wherein comparing the second vector representations comprises comparing second vector representations corresponding to two different ones of the second plurality of time periods for the target computer system using the vector similarity function, wherein the two different ones of the second plurality of time periods are separated from each other in time by at least one other one of the second plurality of time periods.

21. A computer system comprising a processor and memory storing computer program code for performing the method of claim 1.

22. A non-transitory computer-readable storage medium storing computer program code to, when loaded into a computer system and executed thereon, cause the computer system to perform the method of claim 1.

*   *   *   *   *